(12) United States Patent
Yang et al.

(10) Patent No.: US 11,070,959 B2
(45) Date of Patent: Jul. 20, 2021

(54) FUNCTIONS AND METHOD FOR HANDLING A CREDIT POOL OF SERVICE UNITS

(71) Applicant: Telefonaktiebolaget LM Ericsson (publ), Stockholm (SE)

(72) Inventors: Yong Yang, Kållered (SE); Ioannis Sapountzis, Mölndal (SE); Jiehong Yang, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/623,008

(22) PCT Filed: Jul. 19, 2017

(86) PCT No.: PCT/EP2017/068218
§ 371 (c)(1),
(2) Date: Dec. 16, 2019

(87) PCT Pub. No.: WO2019/015750
PCT Pub. Date: Jan. 24, 2019

(65) Prior Publication Data
US 2020/0404467 A1    Dec. 24, 2020

(51) Int. Cl.
*H04W 4/24* (2018.01)
*H04L 12/14* (2006.01)
*H04M 15/00* (2006.01)

(52) U.S. Cl.
CPC .......... *H04W 4/24* (2013.01); *H04L 12/1407* (2013.01); *H04M 15/61* (2013.01); *H04M 15/66* (2013.01); *H04M 2215/32* (2013.01)

(58) Field of Classification Search
CPC .............. H04W 4/24; H04W 28/0215; H04W 28/0247; H04W 28/10; H04L 12/1403;
(Continued)

(56) References Cited

U.S. PATENT DOCUMENTS 6,879,820 B2     4/2005   Bjelland et al.
7,277,702 B2 *  10/2007   Ropolyi ................. H04L 63/00
                                                      370/352
(Continued)

OTHER PUBLICATIONS

3rd Generation Partnership Project, "3rd Generation Partnership Project; Technical Specification Group Services and System Aspects; Architecture Enhancements for Control and User Plane Separation of EPC Nodes; Stage 2 (Release 14)", Technical Specification, 3GPP TS 23.214 V14.3.0, Jun. 1, 2017, pp. 1-78, 3GPP.

(Continued)

*Primary Examiner* — Jean A Gelin
(74) *Attorney, Agent, or Firm* — Coats + Bennett, PLLC

(57) ABSTRACT

The embodiments herein relate to a method performed by a Control Plane (CP) function (401) for handling a credit pool comprising granted service units to be used by multiple services. The multiple services are grouped in at least one first Rating Group (RG). The CP function (401) creates an individual Usage Reporting Rule (URR) for each of the at least one first RG. Each individual URR comprises a first credit pool threshold. The CP function provides the individual URRs to a User Plane (UP) function (405). The CP function (401) creates a Usage Reporting Rule for the Credit Pool (URR CRPL). The URR CRPL comprises instructions to the UP function (405) to aggregate service unit usage for all individual URRs for all first RGs. The URR CRPL further comprises the first credit pool threshold. The CP function (401) provides the URR CRPL to the UP function (405).

25 Claims, 12 Drawing Sheets

(58) Field of Classification Search
CPC ............... H04L 12/1407; H04L 12/141; H04L 12/1453; H04L 12/1485; H04L 45/38; H04L 47/2441; H04M 15/61; H04M 15/66; H04M 2215/32; H04M 15/775; H04M 15/8235; H04M 15/8228
See application file for complete search history.

(56) References Cited

U.S. PATENT DOCUMENTS

| | | | |
|---|---|---|---|
| 7,616,958 B2 * | 11/2009 | Kato | H04W 16/00 370/338 |
| 9,479,917 B1 * | 10/2016 | Gota | H04M 15/8228 |
| 2016/0077846 A1 * | 3/2016 | Phillips | G06Q 10/06 718/1 |
| 2019/0215403 A1 * | 7/2019 | Chai | H04L 12/14 |

OTHER PUBLICATIONS

3rd Generation Partnership Project, "3rd Generation Partnership Project; Technical Specification Group Core Network and Terminals; Interface Between the Control Plane and the User Plane of EPC Nodes; Stage 3 (Release 14)", Technical Specification, 3GPP TS 29.244 V14.1.0, Sep. 1, 2017, pp. 1-146, 3GPP.

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V05.0, May 1, 2017, pp. 1-145, 3GPP.

Huawei, "Pseudo-CR on Definition of FAR ID and QER ID", 3GPP TSG CT4 Meeting #78, Zhangjiajie, China, May 15, 2017, pp. 1-14, C4-173xyz, 3GPP.

3rd Generation Partnership Project, "3rd Generation Partnership Project; Technical Specification Group Services and System Aspects; Telecommunication Management; Charging Management; Charging Architecture and Principles (Release 14)", Technical Specification, 3GPP TS 32.240 V14.4.0, Jun. 1, 2017, pp. 1-56, 3GPP.

* cited by examiner

FUNCTIONS AND METHOD FOR HANDLING A CREDIT POOL OF SERVICE UNITS

TECHNICAL FIELD

Embodiments herein relate generally to a Control Plane (CP) function, a method performed by the CP function, a User Plane (UP) function and a method performed by the UP function. More particularly the embodiments herein relate to for handling a credit pool comprising granted service units to be used by multiple services.

BACKGROUND

In the field of telecommunication network, charging is a term which relates that information related to a chargeable event is obtained, processed, transferred and analysed in order to determine data usage for which a charged party should be billed (offline charging) or for which a subscriber's account should be debited (online charging). In order to perform charging, the network needs to perform real-time monitoring of resource usage. Charging mechanisms are present in different domains, services and subsystems in a telecommunication network.

Credit control is a mechanism that interacts with an account and controls or monitors the charges related to the service usage. Using other words, credit control may be described as a process of checking whether credit is available, credit reservation, deduction of credit from the end user account when a service is completed and refunding of reserved credit that is not used.

A set of services may be grouped or gathered in a so called Rating Group (RG). The RG may also be referred to as a Charging Key (CK). The set of services in a RG is subject to the same cost and rating type (e.g. 0.1 $/minute). A credit control server may authorize or grant credit for one or more services in a RG, or for the whole RG. A quota is allocated to a RG, and all service belonging to that RG can draw credit from that allocated quota. The allocated quota may also be referred to as a granted quota. FIG. 1 illustrates the relationship between service ID, RG, credit pool and credit-control (sub-) session. When multiple services are used within the same user session and each service or group of services is subject to different cost, it is necessary to perform credit-control for each service independently. A credit-control application enables independent credit-control of multiple services in a single credit-control (sub-)session. It is possible to request and allocate resources as a credit pool shared between multiple services. As mentioned above, the services can be grouped into RGs in order to achieve even further aggregation of credit allocation. It is also possible to request and allocate quotas on a per service basis. The quotas are allocated to a credit pool and can be re-authorized independently at any time. FIG. 1 illustrates two credit pools, credit pool x and credit pool y. Credit pool x has two allocated quotas, i.e. quota Q1 and quota Q2. A service with service-Id b and another service with service-Id b can draw credit from quota Q1. Credit pool y has one allocated quota, i.e. quota Q3. A service with service Id z belongs to RG n which can draw credit from quota Q3. A service with service-Id c and a service with service-Id d are grouped into RG 1 which can draw credit from quota Q2. The services with service-ID a, b, c, d . . . z all belong to the same Diameter Credit-Control (DCC) (sub-) session.

One mechanism used in relation to charging is a credit pool which is used to avoid credit fragmentation when online charging is applied, whereby granted quotas are linked into a credit pool. In other words, service units are provided as a pool that applies to multiple services or RGs. This is achieved by providing the service units in the form of a quota for a particular service or rating group, and also by including a reference to a credit pool for that unit type. Services draw unit from the credit pool. A service may be defined as a type of task performed by a service element for an end user. A service may be used by an end user, e.g. a person using a mobile phone. The reference to the credit pool includes a multiplier derived from a rating parameter, which translates from service units of a specific type to the service units in the credit pool. For instance, if the rating parameter for service number 1 is $1/MB and the rating parameter for service number 2 is $0.5/MB, the multipliers could be 10 and 5 for services 1 and 2, respectively.

If S is the total service units (the total service units is the same as the total credit) within the credit pool, $M_1, M_2, \ldots, M_n$ are the multipliers provided for services 1, 2, ..., n, and $C_1, C_2, \ldots, C_n$ are the used resources within the session (where n is zero or any positive integer), then the pool credit is exhausted and re-authorization must be sought when:

$$C_1*M_1+C_2*M_2+ \ldots +C_n*M_n >= S$$

The total credit in the pool, S, is calculated from the quotas ($Q_1, Q_2, \ldots Q_n$, where n is zero or any positive integer), which are currently allocated to the pool as follows:

$$S=Q_1*M_1+Q_2*M_2+ \ldots +Q_n*M_n$$

If services or rating groups are added to or removed from the pool, then the total credit is adjusted appropriately. Note that when the total credit is adjusted because services or rating groups are removed from the pool, the value that need to be removed is the consumed one (i.e., $C_x*M_x$).

Re-authorizations for an individual service or rating group may be sought at any time; for example, if a 'non-pooled' quota is used up or the Validity-Time expires.

Where multiple Granted-Service-Unit (GSU)-Pool-Reference Attribute Value Pairs (AVPs) with the same GSU-Pool-Identifier are provided within a Multiple-Services-Credit-Control AVP along with the Granted-Service-Unit AVP, then these must have different CC-Unit-Type values, and they all draw from the credit pool separately. For instance, if one multiplier for time (M1t) and one multiplier for volume (M1v) are given, then the used resources from the pool is the sum $C_{1t}*M_{1t}+C_{1v}*M_{1v}$, where C1t is the time unit and C1v is the volume unit.

A granted service unit (GSU) is the quota granted by an charging system such as e.g. an Online charging system (OCS) (or may also be the quota provisioned by OCS). A service unit may be a granted service unit, used service unit, etc., it depends on the context.

Where service units are provided within a Multiple-Services-Credit-Control AVP without a corresponding GSU-Pool-Reference AVP, then these are handled independently from any credit pool and from any other services or rating groups within the session.

The credit pool concept is an optimal tool to avoid the over-reservation effect of the basic single quota tariff time change mechanism. Therefore, Diameter credit-control clients and servers implementing the independent credit-control of multiple services should leverage the credit pool concept when supporting the tariff time change. The Diameter credit-control server should include both the Tariff-Time-Change and Tariff-Change-Usage AVPs in two quota allocations in the answer message (i.e., two instances of the Multiple-Services-Credit-Control AVP). One of the granted units is allocated to be used before the potential tariff change, while the second granted units are for use after a tariff change. Both granted unit quotas must contain the same Service-Identifier and/or Rating-Group. This dual quota mechanism ensures that the overall reported used units would never exceed the credit reservation. The Diameter credit-control client reports both the used units before and after the tariff change in a single instance of the Multiple-Services-Credit-Control AVP.

In release 14 of 3GPP, it is proposed to separate the control plane and user plane functionality of some Evolved Packet Core (EPC) nodes, such as the Serving Gateway (SGW), Packet data network Gateway (PGW) and Traffic Detection Function (TDF). FIG. 2 from 3GPP TS 23.214 V14.3.0 (2017 June) illustrates an example architecture reference model in the case of separation between user plane and control plane. This architecture reference model covers non-roaming as well as home routed and local breakout roaming scenarios.

Sx is an interface between the control plane and the user plane, and will be described in more detail below. Parameters which are conveyed over the Sx between the CP function to the UP function are described in the following four different rules, one Detection Rule and three different "enforcement" rules:
  Packet Detection Rule (PDR): Describing what packets should receive a certain treatment (e.g. forwarding and other types of enforcement).
  Forwarding Action Rule (FAR): Comprises forwarding actions to be applied to a packet.
  Usage Reporting Rule (URR): Comprises information that defines a certain measurement and how it shall be reported.
  QoS Enforcement Rule (QER): Comprises information related to QoS enforcement of traffic.

One or more Usage Reporting Rule(s) are provided by the CP function for an Sx session in an Sx Session Establishment Request or an Sx Session Modification Request to request the UP function to:
  measure the network resources usage in terms of traffic data volume, duration (i.e. time) and/or events, according to the provisioned Measurement Method; and
  send a usage report to the CP function, when the measurement reaches a certain threshold, periodically or when detecting a certain event, according to the provisioned Reporting Triggers.

To support the charging function including both for the online or offline charging, the CP function will instruct UP how to perform the usage measurement and how/when to generate the desired usage report as below:
  creating Packet Detection Rules(s) to represent a service data flow, an application, a bearer or a session;
  creating Usage Reporting Rule(s) for each Charging Key required, combination of Charging Key and Service ID, or combination of Charging Key, Sponsor ID and Application Service Provider Id;
  associating a URR(s) to the relevant PDRs;

In this way the usage report(s) for the desired level, e.g. a bearer, a session, TDF session, a Service Data Flow or an application level can be generated by the UP function, and be reported to the CP function. Therefore a URR comprises information that defines a certain measurement (how a packet shall be accounted) and how the measurement shall be reported.

FIG. 2 illustrates the User Plane (UP, U) which comprises the SWG-User plane (SGW-U) 201 which is connected to the PGW-User plane (PGW-U) 203 via the S5/8-U interface, and the PGW-U 203 may be connected to the TDF-User plane (TDF-U) 205 via the SGi interface (TDF-U 205 is an optional functional entity). The TDF-U 205 may be connected to the Operator's Internet Protocol (IP) Services 208, e.g. the IP Multimedia Subsystem (IMS), Packet Switch Streaming (PSS) etc., via the SGi interface. The Control Plane (CP, C) comprises the SGW-Control plane (SGW-C) 210 which is connected to the PGW-Control plane (PGW-C) 213 via the S5/8-C interface. The control plane may further comprises the TDF-Control plane (TDF-C) 215 (TDF-C 215 is an optional functional entity) which is connected to the TDF-U 205 in the user plane via the Sxc interface. The PGW-C 213 is connected to the PGW-U 203 via the Sxb interface. The SGW-C 210 is connected to the SGW-U 201 via the Sxa interface. Thus, the Sx interface is an interface between the user plane and the control plane.

The architecture in FIG. 2 only depicts the case when the CP and UP functions of all SGW, PGW and TDF nodes are split. However, the other cases when the CP and UP function of only one of these nodes is split while the CP and UP function of the other interfacing node is not split, e.g. PGW's control plane and user plane is split while SGW's control plane and user plane is not split, are also supported. The split architecture of a node does not put any architectural requirements on the peer nodes with which it interfaces.

FIG. 3 (from 3GPP TS 23.214 V14.3.0 (2017 June) illustrates an example of an architecture reference model with separation of user plane and control plane for a combined SGW/PGW. The usage of a combined SGW/PGW is possible in a deployment with separated control and user planes. This is enabled by supporting an Sx interface with a common parameter structure for non-combined and combined cases. The control plane comprises the combined SGW/PGW-C 301 which is connected to the combined SGW/PGW-U 303 via the combined Sxa/Sxb interface.

The prior art brings the credit pool concept to the UP function which requires that the UP function manages the granted service units to be shared among different RGs. This is contrary to the principle that a UP function should be designed as simple as possible since the UP function is intended to be a simple packet forwarding device.

With the current solution, it is not clear how to use the existing parameters Pool Time Threshold (PTMTTH) and Pool Volume Threshold (PVOLTH) when the Credit Pool Information Element (IE) is included in the same URR. It is also not clear how the multiplier works when packets should be counted. Furthermore, is provided any procedure for how the CP should map or calculate the obtained quota/quotas (per individual RG or pooled RGs) to the quota provisioned to UP. Also, conditions that trigger the UP reporting to the CP when different RGs (provisioned through different URRs) are pooled together are not known.

Therefore, there is a need to at least mitigate or solve at least one of these issues.

SUMMARY

An objective of embodiments herein is therefore to obviate at least one of the above disadvantages and to provide support for credit pool when the user plane and control plane are separated.

According to a first aspect, the object is achieved by a method performed by a CP function for handling a credit pool comprising granted service units to be used by multiple services. The multiple services are grouped in at least one first RG. The CP function creates an individual URR for each of the at least one first RG. Each individual URR comprises a first credit pool threshold. The CP function provides the individual URRs to a UP function. The CP function creates a Usage Reporting Rule for the Credit Pool (URR CRPL). The URR CRPL comprises instructions to the UP function to aggregate service unit usage for all individual URRs for all first RGs. The URR CRPL further comprises the first credit pool threshold. The CP function provides the URR CRPL to the UP function.

According to a second aspect, the object is achieved by a method performed by a UP function for handling a credit pool comprising granted service units to be used by multiple services. The multiple services are grouped in at least one first RG. The UP function obtains, from a CP function, an individual URR for each of the at least one first RGs. Each individual URR comprises a first credit pool threshold. The UP function obtains a URR CRPL from the CP function. The URR CRPL comprises instructions to aggregate service unit usage for all individual URRs for all first RGs. The URR CRPL further comprises the first credit pool threshold. The UP function counts the used service units for each individual URR for the first RGs. The UP function aggregates the counted service unit usage for all individual URRs for all first RGs.

According to a third aspect, the object is achieved by a CP function for handling a credit pool comprising granted service units to be used by multiple services. The multiple services are grouped in at least one first RG. The CP function is configured to create an individual URR for each of the at least one first RG. Each individual URR comprises a first credit pool threshold. The CP function is further configured to provide the individual URRs to a UP function. The CP function is configured to create a URR CRPL. The URR CRPL comprises instructions to the UP function to aggregate service unit usage for all individual URRs for all first RGs. The URR CRPL further comprises the first credit pool threshold. The CP function is configured to provide the URR CRPL to the UP function.

According to a fourth aspect, the object is achieved by a UP function for handling a credit pool comprising granted service units to be used by multiple services. The multiple services are grouped in at least one first RG. The UP function is configured to obtain, from a CP function, an individual URR for each of the at least one first RGs. Each individual URR comprises a first credit pool threshold. The UP function is configured to obtain a URR CRPL from the CP function. The URR CRPL comprises instructions to aggregate service unit usage for all individual URRs for all first RGs. The URR CRPL further comprises the first credit pool threshold. The UP function is configured to count the used service units for each individual URR for the first RGs. The UP function is further configured to aggregate the counted service unit usage for all individual URRs for all first RGs.

Thanks to the URR CRPL, support for the credit pool is provided when the user plane and control plane are separated.

Embodiments herein afford many advantages, of which a non-exhaustive list of examples follows:

An advantage of the embodiments herein is that they provide an efficient mechanism by adding an extra 'pooled' URR, without breaking the principle that a URR is used to instruct the UP function how to count the packet, and therefore avoiding complicated UP function implementation with unnecessary information, e.g. credit pool concept, to satisfy the credit pooling requirement.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
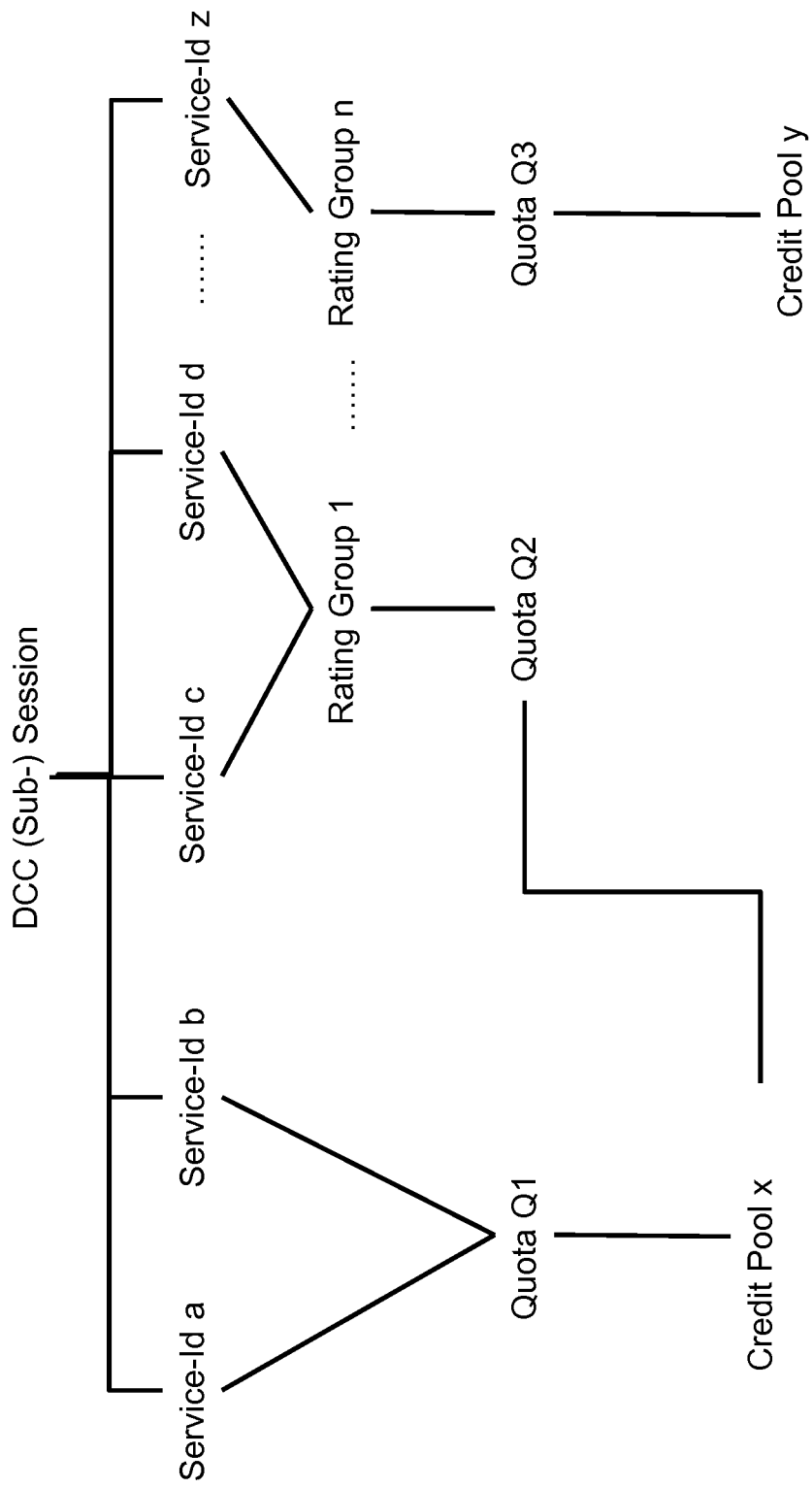
FIG. 1 is a schematic drawing illustrating the relationship between service ID, RG, credit pool and credit-control (sub-) session.
Figure 2:
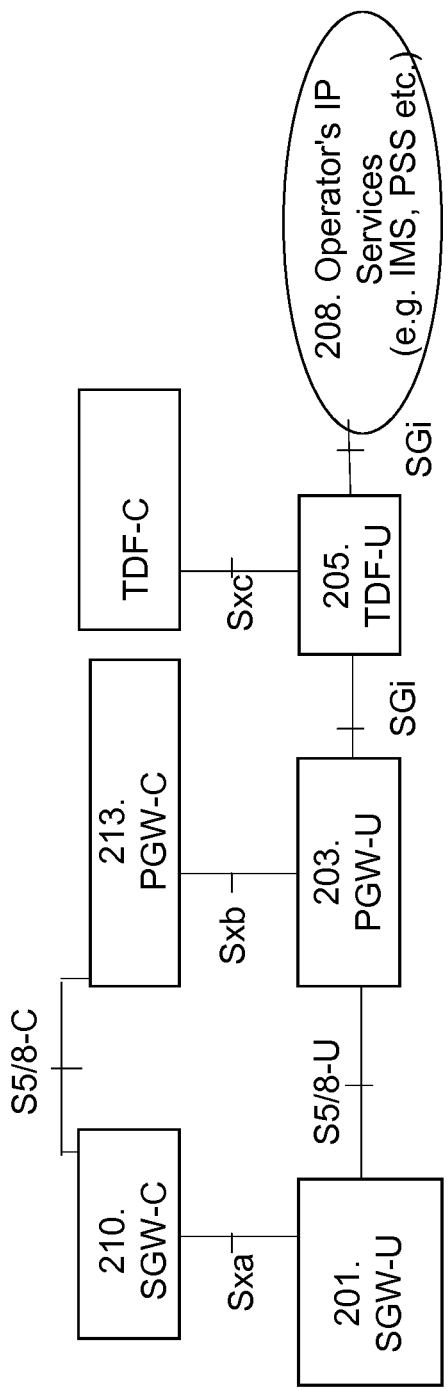
FIG. 2 is a schematic block diagram illustrates an example architecture reference model in the case of separation between UP and CP.
Figure 3:
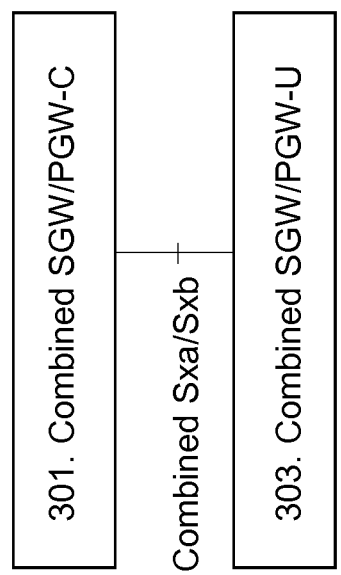
FIG. 3 is a schematic block diagram illustrating an example of an architecture reference model with separation of UP and UP for a combined SGW/PGW.
Figure 4:
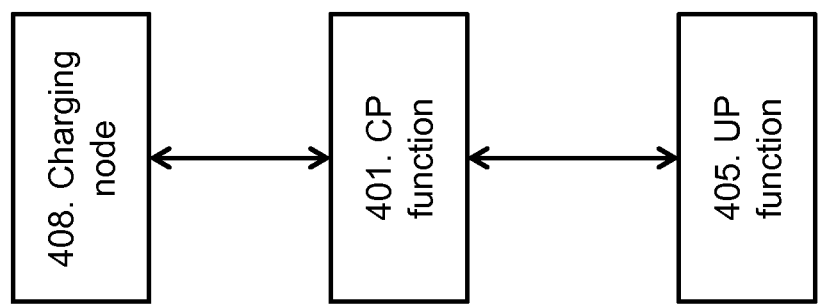
FIG. 4 is a schematic block diagram illustrating separation between the user plane and control plane.

FIG. 4 illustrates the separation between the CP and the UP as described earlier. In detail, FIG. 4 illustrates a CP function 401 which is connectable to the UP function 405. The interface between the CP function 401 and the UP function 405 may be referred to as an Sx interface. The CP function 401 may be connectable to a charging node 408 via a suitable interface.

The CP function 401 may be also referred to as a CP function entity, a CP entity, a CP node implementing a CP function, a CP module etc. The CP function 401 may be a PGW-C, a TDF-C or a combined SGW-C and PGW-C.

The UP function 405 may be referred to as a UP function entity, a UP entity, a UP node implementing a UP function, a UP module etc. The UP function 405 may be a PGW-U, a TDF-U or a combined SGW-U and PGW-U.

The charging node 407 may be an OCS node, an OCS function, an OCS entity, an Offline Charging System (OFCS) node, an OFCS function, an OFCS entity etc.

Figure 5:
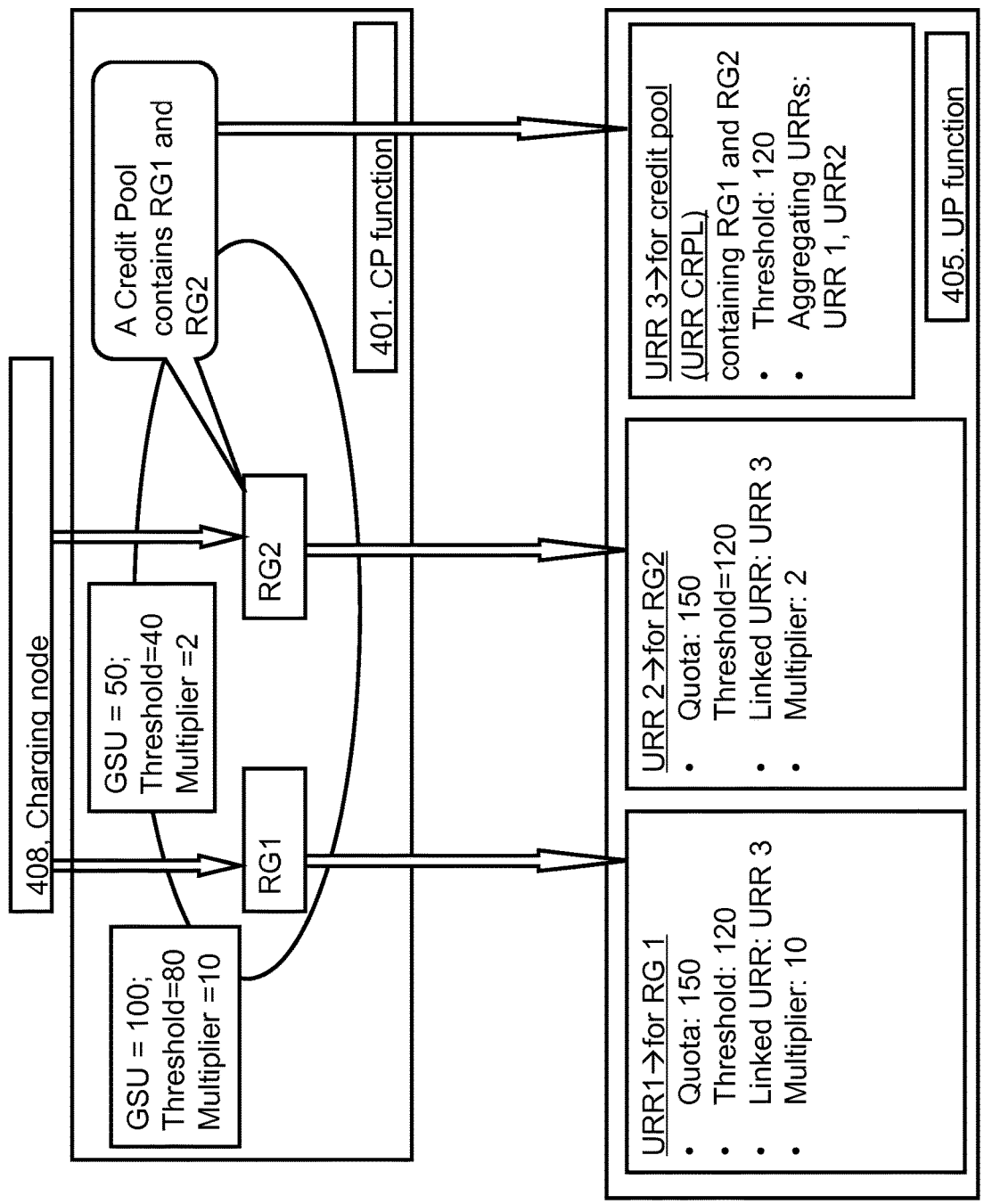
FIG. 5 is a signaling diagram illustrating an example embodiment.

FIG. 5 is a schematic diagram which provides a conceptual description of the embodiments herein. The FIG. 5 illustrates the CP function 401, the UP function 405 and the charging node 408. The CP function 401 is associated with a credit pool which comprises two RGs, i.e. RG 1 and RG 2. RG 1 has a number of GSU of 100, a threshold of 80 and a multiplier which is 10. The GSU is the quota granted from or provisioned by e.g. the charging node 408. The RG 2 has a number of GSU of 50, a threshold of 40 and a multiplier which is 2. The CP function 401 generates and provides individual URRs (URR1 and URR 2) and a URR CRPL (URR 3) to the UP function 405. In more detail, an individual URR 1 for RG 1 comprises a quota which is 150, a threshold which is 120, linked URR which is URR 3. Since RG1 which is associated with the URR 1 is part of the credit pool, the quota for URR 1 is the sum of the quota (i.e. the GSUs) for RG 1 and RG2 (the components in the credit pool), i.e. 100+50=150. The threshold for the URR 1 is the sum of the thresholds for RG1 and RG2, i.e. 80+40=120. The linked URR indicates that the URR 1 is linked to the URR 3 which is the URR CRPL. The multiplier for URR 1 is the same as the multiplier for RG1. The individual URR 2 for RG2 comprises a quota which is 150, a threshold which is 120, linked URR which is URR 3 (i.e. the URR CRPL) and a multiplier which is 2. The quota and threshold comprised in URR 2 is calculated in the same way as in URR 1. One difference between the URR 1 and URR 2 is the multiplier.

The multiplier comprised in URR 1 is 10 and the multiplier comprised in URR 2 is 2. The URR 3 is for the credit pool and is therefore also referred to as the URR CRPL. The URR 3 comprises RG1 and RG2 (the RGs in the credit pool). The URR 3 comprises the threshold which is 120 (the same threshold as in URR 1 and URR 2). The URR 3 comprises in addition an aggregation of URRs in the pool, e.g. in the form of a list of URR 1 and URR 2.

Note that a threshold is a part of a GSU (GSU is the same as the quota), e.g. a % of the GSU such as e.g. 80%. Using other words, a threshold is x % of the quota to ensure the report is earlier enough to prevent the user data be transferred without quota (during the signalling procedure requesting the new quota).

The method for handling a credit pool comprising granted service units to be used by multiple services according to some embodiments will now be described with reference to the signalling diagram in FIG. 6. The method comprises at least one of the following steps, which steps may as well be carried out in another suitable order than described below. For example, steps 605-609 may be performed after steps 610-613.

Step 601

The CP function 401 creates at least one individual URR and a URR CRPL. There is one individual URR per RG. Considering the example in FIG. 5 where the credit pool comprises two RGs, i.e. RG 1 and RG 2. In this example, there is one individual URR 1 for RG 1 and one individual URR 2 for RG 2. Each individual URR comprises a credit pool threshold, which is the sum of the threshold for each of the RGs in the credit pool. Each individual URR may further comprises a link to the URR CRPL, a multiplier and a quota.

A credit pool may comprise one or more RGs.

The URR CRPL comprises the credit pool threshold, which is the same credit pool threshold as comprised in each of the individual URRs. The URR CRPL comprises instructions directed to the UP function 405. The instructions are to aggregates service unit usage for all individual URRs for all RGs in the credit pool. The instructions may be in the form of a parameter referred to as "aggregating usage of reports". Using the example in FIG. 5 again, the instructions indicate that the UP function 405 should aggregate service unit usage for URR 1 and for URR 2. The instructions may be in the form of a list of the individual URRs of which the service unit usage should be aggregated, e.g. a list comprising URR 1 and URR 2 or a list comprising URR 1 ID and URR 2 ID.

Step 602

The CP function 401 provides the individual URRs and the URR CRPL to the UP function 405. The providing may be performed by directly transmitting the individual URRs and the URR CRPL from the CP function 401 to the UP function 405, or by that the CP function 401 stores the individual URRs and the URR CRPL in a memory (e.g. in the cloud) from which the UP function 405 can obtain them.

The individual URRs and the URR CRPL may be provided together or separately. In case there are two or more individual URRs, these may be provided together or separately.

Step 603

The UP function 405 obtains the individual URRs and the URR CRPL. Triggered by the instruction to aggregate the service unit usage in the URR CRPL, the UP function 405 starts to count the used service units for each individual URRs indicated in the URR CRPL, e.g. which are indicated in a list in the URR CRPL. The UP function 405 also aggregates the counted used service units for all the individual URRs.

Step 604

Information indicating the service unit usage is provided from the UP function 405 to the CP function 401. This information may be provided in a usage report. The service unit usage may be for one URR or it may be for two or more URRs, or it may be for all URRs associated with the pool, i.e. the aggregated service unit usage. The providing is done upon request, on a regular basis, when the aggregated service unit usage has reached the credit pool threshold, when there has been a change of RAT technology, or due to any other suitable reporting triggers or the UP function 405 to send a report to the CP function. Below is an example of some reporting triggers:

Periodic Reporting (PERIO): when set to 1, this indicates a request for periodic reporting.

Volume Threshold (VOLTH): when set to 1, this indicates a request for reporting when the data volume usage reaches a volume threshold.

Time Threshold (TIMTH): when set to 1, this indicates a request for reporting when the time usage reaches a time threshold.

Quota Holding Time (QUHTI): when set to 1, this indicates a request for reporting when no packets have been obtained for a period exceeding the Quota Holding Time.

Start of Traffic (START): when set to 1, this indicates a request for reporting when detecting the start of a Service Data Flow (SDF) or Application traffic.

Stop of Traffic (STOPT): when set to 1, this indicates a request for reporting when detecting the stop of an SDF or Application Traffic.

Dropped DL Traffic Threshold (DROTH): when set to 1, this indicates a request for reporting when the Downlink (DL) traffic being dropped reaches a threshold.

Linked Usage Reporting (LIUSA): when set to 1, this indicates a request for linked usage reporting, i.e. a request for reporting a usage report for a URR when a usage report is reported for a linked URR.

Volume Quota (VOLQU): when set to 1, this indicates a request for reporting when a Volume Quota is exhausted.

Time Quota (TIMQU): when set to 1, this indicates a request for reporting when a Time Quota is exhausted.

The CP function 401 obtains the information indicating the aggregated service unit usage from the UP function 405.

The information indicating the aggregated service unit usage may also be referred to as a usage report, and such report may comprise the information indicating the aggregated service unit usage.

The aggregated service unit usage is provided by direct transmission from the UP function 405 to the CP function 401, or by that the UP function 405 stores the aggregated service unit usage in a memory (e.g. in the cloud), from which the CP function 401 can obtain the aggregated service unit usage.

Step 605

The CP function 401 may determine that additional service units needs to be requested from the charging node 408, and provides a request for additional credit to the charging node 408. This decision may be taken based on operator's policy. If no new granted service unit is obtained, the CP function 401 needs to update the pool credit as well.

Step 606

When the charging node 408 has obtained the request in step 605, it grants the requested additional service units, if possible. For example, the additional granted service units may be Step 607

The charging node 408 provides information indicating the grant of the requested additional service unit to the CP function 401. The CP function 401 obtains the information from the charging node 408.

Step 608

The CP function 401 updates the credit pool threshold based on the granted additional service unit from the charging node 408. Using the example in FIG. 5 again, where the credit pool threshold before step 608 was as follows:

Credit pool threshold=Threshold for RG1+Threshold for RG2=80+40=120.

Assuming an example where the usage report indicated that 30 service units has been used, and that the granted additional service units are 50. Then the updated credit pool threshold will be as follows:

Updated credit pool threshold=Current credit pool threshold−usage+granted additional service units=120−30+50=140.

In case the CP function 401 has not requested any additional service unit from the charging node 408 or if the charging node 408 did not grant any additional service unit (i.e. additional quota), the updated credit pool threshold would be as follows:

Updated credit pool threshold=Current credit pool threshold−usage+granted additional service units=120−30+0=90.

Thus, the credit pool threshold has been updated to 140.

Step 609

The CP function 401 replaces the credit pool threshold which is currently in all individual URRs and in the URR CRPL with the updated credit pool threshold. With the example in FIG. 5, the current credit pool threshold is 120, and this is now replaced with 140. The CP function 401 provides all individual URRs and the URR CRPL with the updated credit pool threshold to the UP function 405.

Step 610

The CP function 401 may detect that an additional RG should be added to the credit pool. For example, a RG 4 should be added to the credit pool. Thus, the pool with the added RG comprises RG1, RG2 and RG 4. The RG 4 may have a GSU=60 and a threshold=70.

Step 611

The CP function 401 updates the credit pool threshold by adding the threshold for the RG 4 to the current credit pool threshold. In an example where the current credit pool threshold is 120, the threshold of 70 for RG 4 is added to 120. Thus, the updated credit pool threshold is as follows:

Updated credit pool threshold=Current credit pool threshold+threshold for additional RG=120+ 70=190.

In case the current threshold is the threshold from step 608, the updated credit pool threshold is as follows:

Updated credit pool threshold=Current credit pool threshold+threshold for additional RG=140+ 70=210.

Step 612

The CP function 401 generates an individual URR for the additional RG, e.g. RG 4. The individual URR for RG 4 comprises the credit pool threshold from step 611, i.e. the updated credit pool threshold. The individual URR for the additional RG also comprises the link to the URR CRPL.

Step 613

The CP function 401 replaces the credit pool threshold which is currently in all individual URRs and in the URR CRPL with the updated credit pool threshold. With the examples provided above current credit pool threshold may be 120 or 140, and this is now replaced with 190 or 210. The CP function 401 provides all individual URRs and the URR CRPL with the updated credit pool threshold to the UP function 405. The UP function 405 obtains the individual URRs and the URR CRPL with the updated credit pool threshold from the CP function 401.

Figure 7:
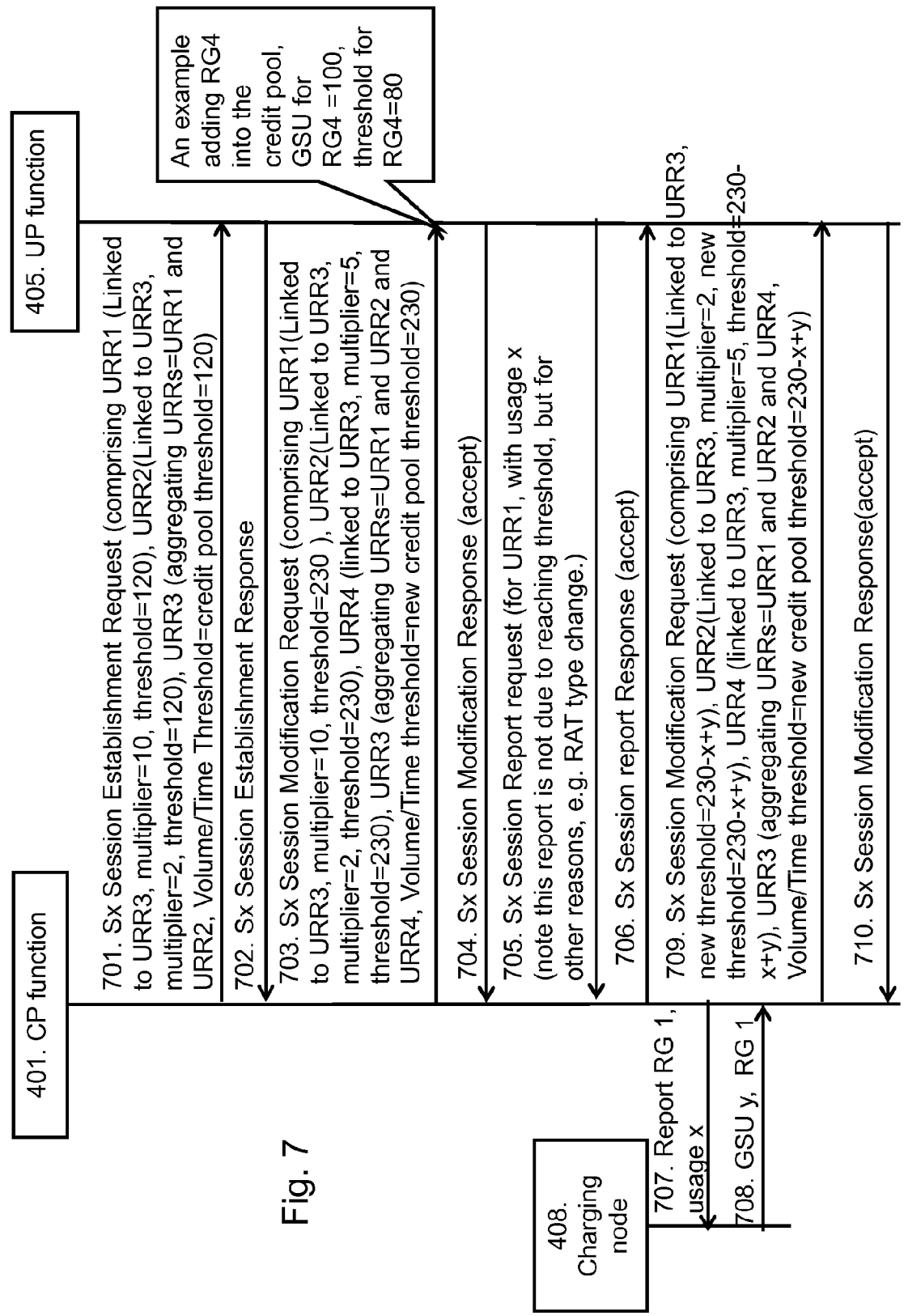
FIG. 7 is a schematic diagram illustrating an example of providing URRs in the Sx Session Establishment and Modification Procedures

FIG. 7 illustrates an example of providing URRs in the Sx Session Establishment and Modification Procedures. At start of the method (i.e. when step 701 is performed), the granted service unit (which is the same as the quota) for URR 1 is 100 and the threshold for URR 1 is 80. The granted service unit for URR 2 is 50 and the threshold for URR 2 is 40. Consequently, the granted service unit for the credit pool is 100+50=150. The credit pool threshold is 80% of the granted service unit for the credit pool, i.e. 80% of 150 which is 120.

The method illustrated in FIG. 7 comprises at least one of the following steps, which steps may be provided in any suitable order than described below:

Step 701

The CP function sends an Sx Session Establishment Request message to the UP function 405. The message comprises URR 1, and the URR 1 comprises a link to URR3 (i.e. the URR CRPL), a multiplier=10, a credit pool threshold=120. The message further comprises URR2 which comprises a linked to URR3 (i.e. the URR CRPL), a multiplier=2 and the credit pool threshold=120. The message also comprises URR3 (which is also referred to as URR CRPL) which comprises aggregating URRs (URR1 and URR2), the credit pool threshold=120. The credit pool threshold may be a threshold which is associated with at least one of volume and/or time Step 702

The UP function 405 may send an Sx Session Establishment Response message to the CP function 401 as a response to the request message in step 701.

Step 703

An additional RG should be added to the credit pool, for example RG 4 having a GSU=100, a multiplier=5 and a threshold=80 (the threshold is exemplified to be 80% of the GSU). The CP function 401 updates the credit pool threshold by adding the threshold of 80 to the current credit pool threshold, e.g. 150+80=230. Thus, the updated credit pool threshold is 230.

The CP function 401 sends an Sx Session Modification Request message to the UP function 405. The message comprises the URR1 which comprise a linked to the URR3 (i.e. the URR CRPL), a multiplier=10 and the updated credit pool threshold=230. The message further comprises URR2 which comprises a link to URR3 (i.e. URR CRPL), a multiplier=2 and the updated credit pool threshold=230. The message also comprises URR4 which comprises a link to URR3 (i.e. the URR CRPL), a multiplier=5 and the updated credit pool threshold=230. The message also comprises URR3 (i.e. the URR CRPL) which comprises aggregating URRs=URR1 and URR2 and URR4. The URR 3 further comprises the updated credit pool threshold=230. The updated credit pool threshold may be a threshold which is associated with at least one of volume and/or time.

Step 704

The UP function 405 sends an Sx Session Modification Response message to the CP function 401. The response message may indicate that the request in step 703 was accepted.

Step 705

The UP function 405 may send an Sx Session Report request message to the CP function 401. The request message is for URR1 and comprises usage x. Note that this report of usage is not necessarily due to reaching threshold, but may also be for other reasons, e.g. RAT type change.

Step 706

The CP function 401 sends an Sx Session report Response message to the UP function 405 to indicate that the request message in step 705 was accepted.

Step 707

The CP function 401 sends a report for RG 1 and its usage=x to the charging node 408 to request additional granted service units.

Step 708

The charging node 408 sends the requested additional granted service units GSU=y for RG 1 back to the CP function 401.

Step 709

The CP function 401 updates the credit pool threshold as follows: 230−x+y.

The CP function 401 sends an Sx Session Modification Request message to the UP function 405. The message comprises URR1 which comprises a linked to URR3 and the updated credit pool threshold=230−x+y. The message further comprises URR2 which comprises a link to URR3, a multiplier=2 and the updated credit pool threshold=230−x+y). The message comprises URR4 which comprises a link to URR3, a multiplier=5 and the updated credit pool threshold=230−x+y. The message also comprises URR3 which comprises aggregating URRs=URR1 and URR2 and URR4, and the updated credit pool threshold=230−x+y. The updated credit pool threshold may be a threshold which is associated with at least one of volume and/or time.

Step 710

The UP function 405 may send an Sx Session Modification Response message to the CP function 401 which indicates that the request message in step 709 was accepted.

Figure 8A:
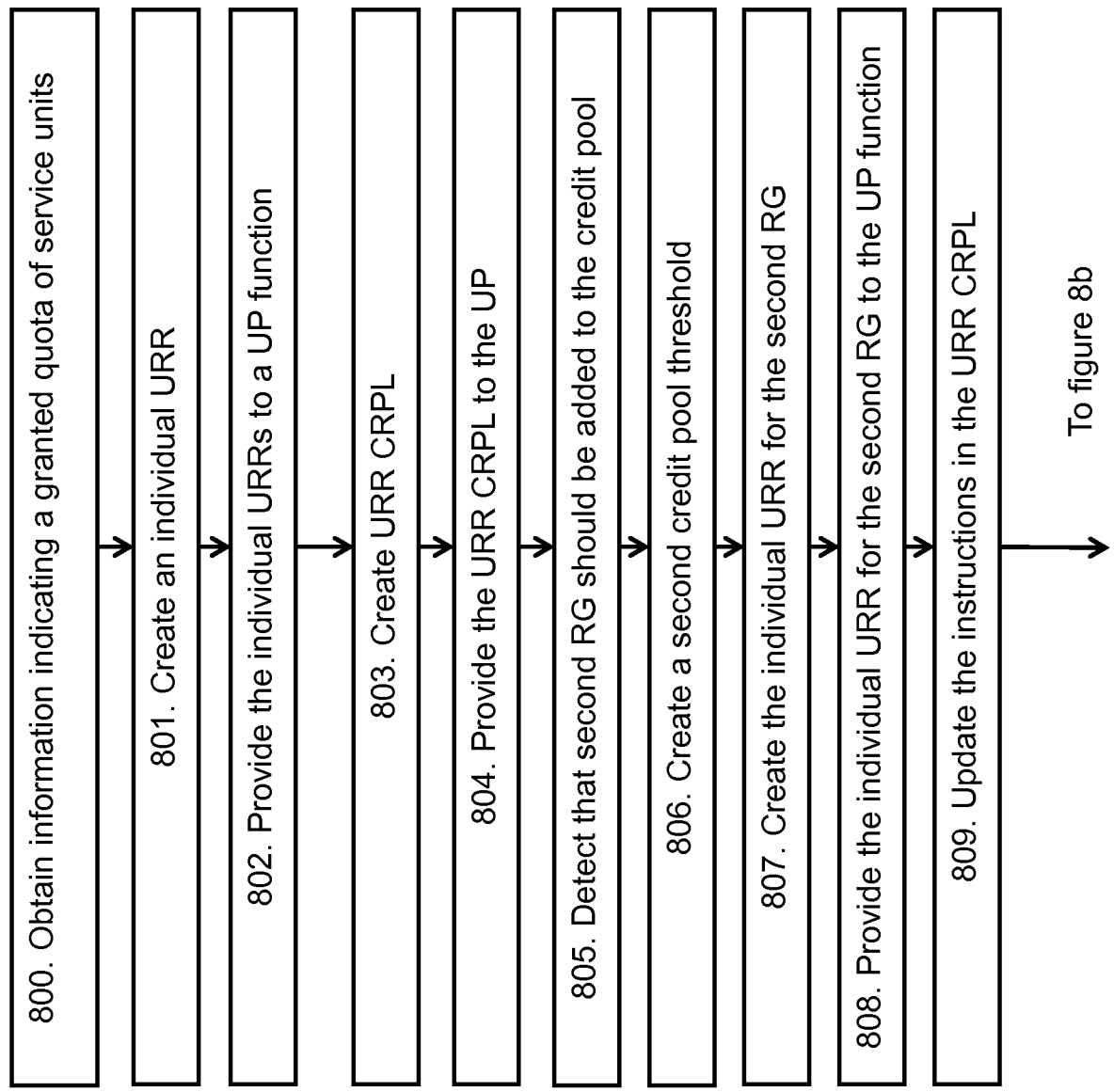
FIG. 8a-8b are flow charts illustrating embodiments of a method performed by a CP function.
Figure 8B:
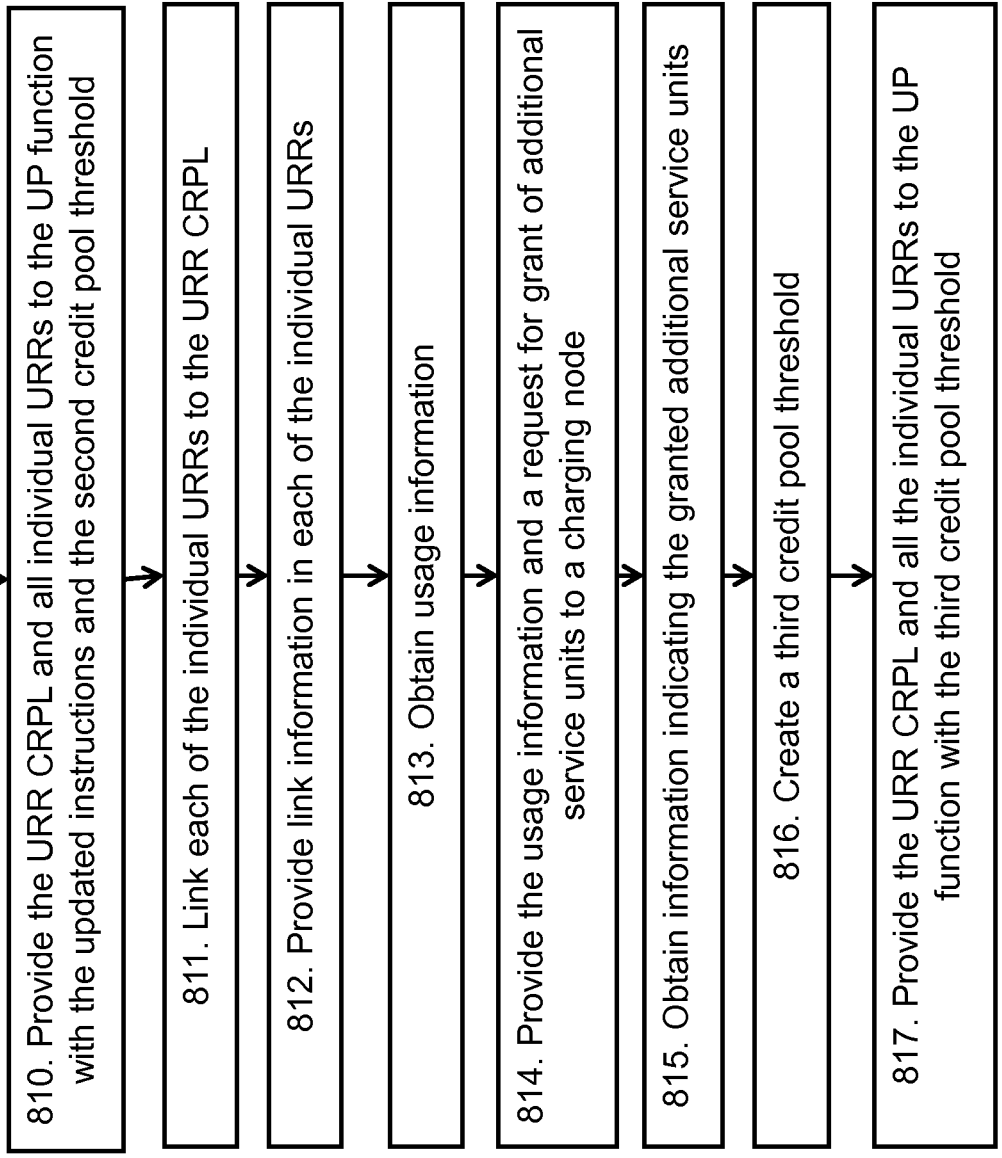

The method described above will now be described seen from the perspective of the CP function 401. FIGS. 8a and 8b illustrates a flowchart describing the present method performed by the CP function 401, for handling a credit pool comprising a number of granted service units to be used by multiple services. FIG. 8b is a continuation of FIG. 8a. FIG. 8a illustrates steps 800-809 and FIG. 8b illustrates steps 810-817. The multiple services are grouped in at least one first RG. There may be one service per RG or there may be two or more services per RG. Thus, a RG comprises one or more services. All of the multiple services may be grouped in one first RG, or one part of the multiple services may be grouped in one first RG and another part of the multiple services may be grouped in another first RG. Thus, the multiple services may be grouped on one or more first RGs. Consequently, the credit pool comprises one or more first RGs. Below are two examples illustrating grouping of multiple service in at least one RG, where the first example comprise 3 services and the second example comprises 8 services:

Example 1—Multiple services=3:

First RG=Service a, service b, service c

Example 2—Multiple services=8:

First RG 1=Service a, service b, service c

First RG 2=Service d, service e

First RG 3=Service f, service g, service h

In example 1, the credit pool comprises one first RG. In example 2, the credit pool comprises three first RGs. Each first RG has a respective individual threshold.

The CP function 401 may be a PGW-C, a TDF-C or a combined SGW-C, and PGW-C.

The method illustrated in FIG. 8 comprises at least one of the following steps to be performed by the CP function 401:

Step 800

This step is seen in FIG. 8a.

The CP function 401 may obtain information indicating a granted quota of service units from the credit pool. The granted quota of service units has been allocated to be used by the multiple services.

Step 801

Figure 6:
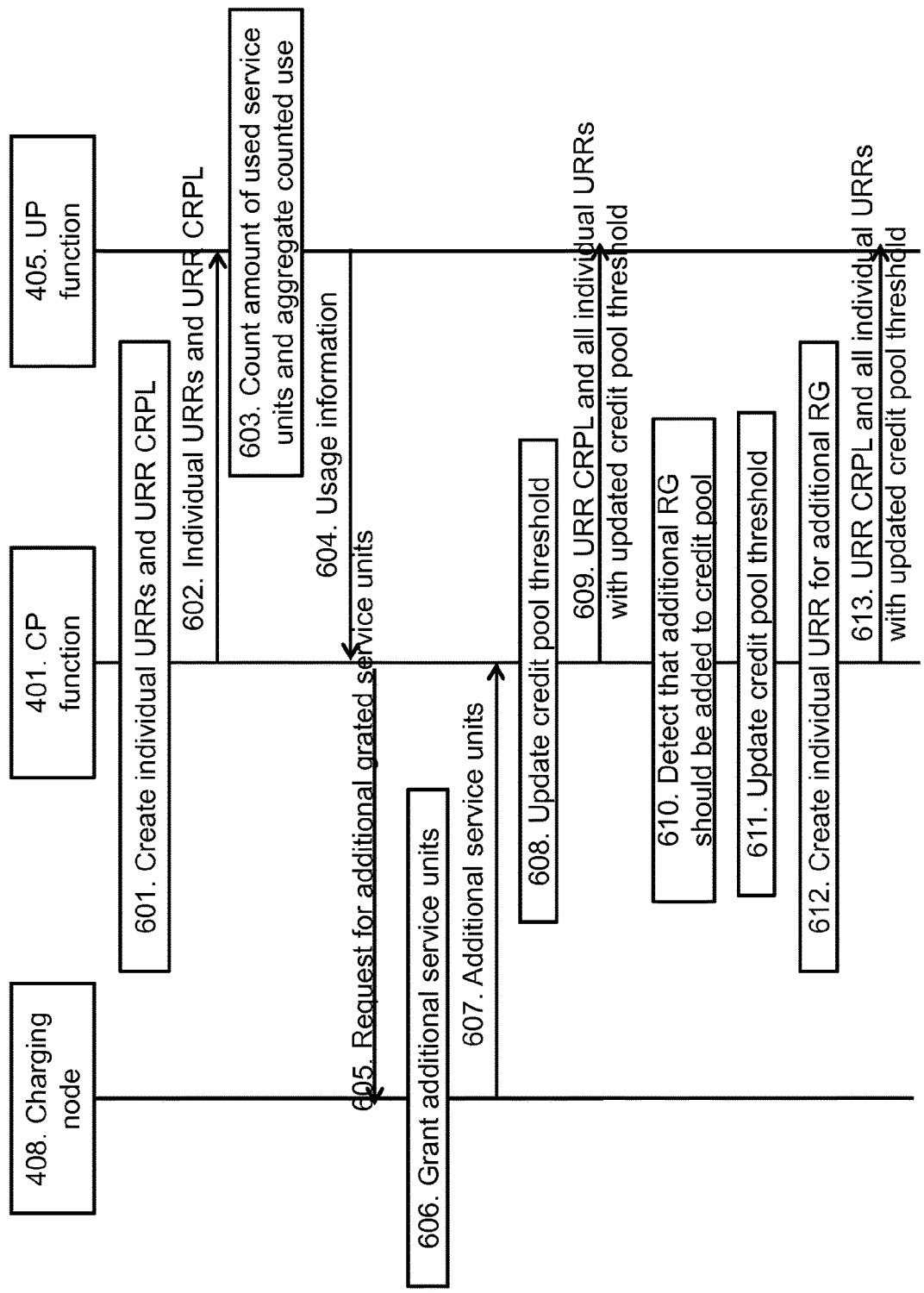
FIG. 6 is a signaling diagram illustrating embodiments of a method.

This step corresponds to step 601 in FIG. 6 and step 701 in FIG. 7. This step is seen in FIG. 8a.

The CP function 401 creates an individual URR for each of the at least one first RG. Each individual URR comprises a first credit pool threshold, i.e. all individual URRs comprise the same first credit pool threshold. The first credit pool threshold may be the sum of the individual threshold for all at least one first RGs in the credit pool. For example, if the credit pool comprises the first RG 1 with threshold 80 and the first RG 2 with threshold 40, then the first credit pool threshold is 80+40=120.

The at least one first RG may be associated with a first threshold associated with service unit volume and/or time for the first RG. The first credit pool threshold may be a sum of all first thresholds. The first credit pool threshold may be a threshold associated with service unit volume and/or time for the credit pool.

Each RG may be associated with a respective individual threshold, and the credit pool threshold may be a sum of all individual thresholds. The credit pool threshold may be a threshold associated with service unit volume and/or time for the credit pool.

Below are two examples illustrating the individual URR for each of the at least one RG, where the first example comprises one first RG and the second example comprises three first RGs:

Example 1—Multiple services=3:
Individual URR 1=First RG=Service a, service b, service c
Example 2—Multiple services=8:
Individual URR 1=First RG 1=Service a, service b, service c
Individual URR 2=First RG 2=Service d, service e
Individual URR 3=First RG 3=Service f, service g, service h A multiplier may be comprised in each of the individual URRs, and the multiplier may indicate how to count user plane packets.

Step 802

This step corresponds to step 602 in FIG. 6 and step 701 in FIG. 7. This step is seen in FIG. 8a.

The CP function 401 provides all individual URRs for the credit pool to a UP function 405. As mentioned earlier, the providing may be done by direct transmission from the CP function 401 to the UP function 405, via an intermediate node or by that the CP function 401 stores the individual URRs in a memory (e.g. in the cloud) from which the UP function 405 obtains the individual URRs.

In case there are two or more individual URRs, they may be provided to the UP function 405 together or separately.

Step 803

This step corresponds to step 601 in FIG. 6 and step 701 in FIG. 7. This step is seen in FIG. 8a.

The CP function 401 creates a URR CRPL. The URR CRPL comprises instructions to the UP function 405 to aggregate service unit usage for all individual URRs for all first RGs. The URR CRPL further comprises the first credit pool threshold. Thus, the URR CRPL and all individual URRs associated with the credit pool comprise the same first credit pool threshold.

The instruction in the URR CRPL may comprise a list of URR IDs of all individual URRs for all RGs. The list may be a parameter referred to as aggregated URR. For example, the list may be as follows:
URR 1 ID
URR 2 ID
URR 3 ID The URR CRPL may be identified with an URR identification (e.g. a URR ID) which may be mapped from a credit pool ID which may be obtained from the charging node 408.

Step 804

This step corresponds to step 602 in FIG. 6 and step 701 in FIG. 7. This step is seen in FIG. 8a.

The CP function provides the URR CRPL to the UP function 405. As mentioned earlier, the providing may be done by direct transmission from the CP function 401 to the UP function 405, via an intermediate node or by that the CP function 401 stores the URR CRPL in a memory (e.g. in the cloud) from which the UP function 405 obtains the URR CRPL.

Step 805

This step corresponds to step 610 in FIG. 6 and step 703 in FIG. 7. This step is seen in FIG. 8a.

The CP function 401 may detect that at least one second RG should be added to the credit pool. The second RG has an individual threshold. Below are two example of this:
Example 1—Multiple services=5:
First RG=Service a, service b, service c
Second RG=Service d, service e
Example 2—Multiple services=11:
First RG 1=Service a, service b, service c
First RG 2=Service d, service e
First RG 3=Service f, service g, service h
Second RG 1=Service i, service j, service k This step may also be described as the CP function 401 may detect that at least one additional RG should be added to the credit pool, and that the additional RG has an additional individual threshold. Below are two examples of this. Example 1 currently comprises one RG and where two additional RGs should be added. Example 2 currently comprises three RGs and where one additional RG should be added:
Example 1—Multiple services=6:
RG 1=Service a, service b, service c
Additional RG 2=Service d, service e
Additional RG 3=Service f
Example 2—Multiple services=11:
RG 1=Service a, service b, service c
RG 2=Service d, service e
RG 3=Service f, service g, service h
Additional RG 4=Service i, service j, service k Step 806

This step corresponds to step 611 in FIG. 6 and step 703 in FIG. 7. This step is seen in FIG. 8a.

The CP function 401 may create a second credit pool threshold by adding the second threshold to the first credit pool threshold:

Second credit pool threshold=Second threshold+first credit pool threshold

This may be also described as the CP function 401 updates the credit pool threshold (the threshold from step 801) by adding the additional threshold for the additional RG to the current credit pool threshold:

Updated credit pool threshold=individual threshold for additional RG+current credit pool threshold Step 807

This step corresponds to step 612 in FIG. 6 and step 703 in FIG. 7. This step is seen in FIG. 8a.

The CP function 401 may create the individual URR for the second RG. The individual URR for the second RG comprises the second credit pool threshold.

This may also be described as the CP function 401 may create the individual URR for the additional RG, wherein the additional individual URR for the additional RG comprises the updated credit pool threshold, i.e. the threshold that was updated in step 806.

Step 808

This step corresponds to step 613 in FIG. 6 and step 703 in FIG. 7. This step is seen in FIG. 8a.

The CP function 401 may provide the individual URR for the second RG to the UP function 405. This may also be described as the CP function 401 may provide the individual URR for the additional RG to the UP function 405.

As mentioned earlier, the providing may be done by direct transmission from the CP function 401 to the UP function 405, via an intermediate node or by that the CP function 401 stores the individual URR in a memory (e.g. in the cloud) from which the UP function 405 obtains the individual URR.

Step 809

This step corresponds to step 613 in FIG. 6 and step 703 in FIG. 7. This step is seen in FIG. 8a.

The CP function 401 may update the instructions comprised in the URR CRPL to additionally aggregate the service unit usage for the second RG.

This may also be described as the CP function 401 may update the instructions comprised in the URR CRPL to additionally aggregate the service unit usage for the additional RG.

Step 810

This step corresponds to step 613 in FIG. 6 and step 703 in FIG. 7. This step is seen in FIG. 8b.

The CP function 401 may provide the URR CRPL and all individual URRs for the first RG to the UP function 405 with the updated instructions and the second credit pool threshold. Note that the second credit pool threshold may also be referred to as an updated credit pool threshold, see step 806 above.

This may also be described as the CP function 401 may provide the URR CRPL and all individual URRs for the RGs (the ones created in step 801) to the UP function 405 with the updated instructions and the updated credit pool threshold.

Step 811

This step is seen in FIG. 8b.

The CP function 401 may link each of the individual URRs to the URR CRPL. With this link, it can be determined that an individual URR belongs to the credit pool.

Step 812

This step is seen in FIG. 8b.

The CP function 401 may provide link information in each of the individual URRs. The link information indicates the link between the respective individual URR and the URR CRPL, and implicitly that the respective individual URR is associated with the credit pool.

The link information may be provided in a parameter referred to as Linked URR. The Linked URR may be only applicable to the individual URR, i.e. in the individual URR. The Linked URR may be described as pointing to the aggregating URR, i.e. URR CRPL.

Step 813

This step corresponds to step 604 in FIG. 6 and step 705 in FIG. 7. This step is seen in FIG. 8b.

The CP function 401 may obtain, from the UP function 405 for at least one of the individual URRs and the URR CRPL associated with the credit pool, usage information indicating service unit usage which has been used by at least one of the multiple services. The usage information may be comprised in a usage report.

Step 814

This step corresponds to step 605 in FIG. 6 and step 707 in FIG. 7. This step is seen in FIG. 8b.

The CP function 401 may provide, to a charging node 408, the usage information and a request for grant of additional service units from the credit pool. The trigger for requesting the grant of additional service units may be the receipt of the usage information in step 814 or any other suitable trigger.

Step 815

This step corresponds to step 607 in FIG. 6 and step 708 in FIG. 7. This step is seen in FIG. 8b.

The CP function 401 may obtain information indicating the granted additional service units from the charging node 408.

Step 816

This step corresponds to step 608 in FIG. 6 and step 709 in FIG. 7. This step is seen in FIG. 8b.

The CP function 401 may create a third credit pool threshold by subtracting the obtained service unit usage from the first credit pool threshold and adding the granted additional service units.

This may also be described as the CP function 401 may update the credit pool threshold by subtracting the obtained service unit usage and adding the granted additional service units from the current credit pool threshold.

Step 817

This step corresponds to step 609 in FIG. 6 and step 709 in FIG. 7. This step is seen in FIG. 8b.

The CP function 401 may provide the URR CRPL and all the individual URRs to the UP function 405 with the third credit pool threshold. This may also be described as the CP function 401 may provide the URR CRPL and all the individual URRs to the UP function 405 with the updated credit pool threshold.

In some embodiments, a computer program may comprise instructions which, when executed on at least one processor, cause the at least one processor to carry out at least one of the method steps 801-817. A carrier may comprise the computer program, and the carrier is one of an electronic signal, optical signal, radio signal or computer readable storage medium.

Figure 9:
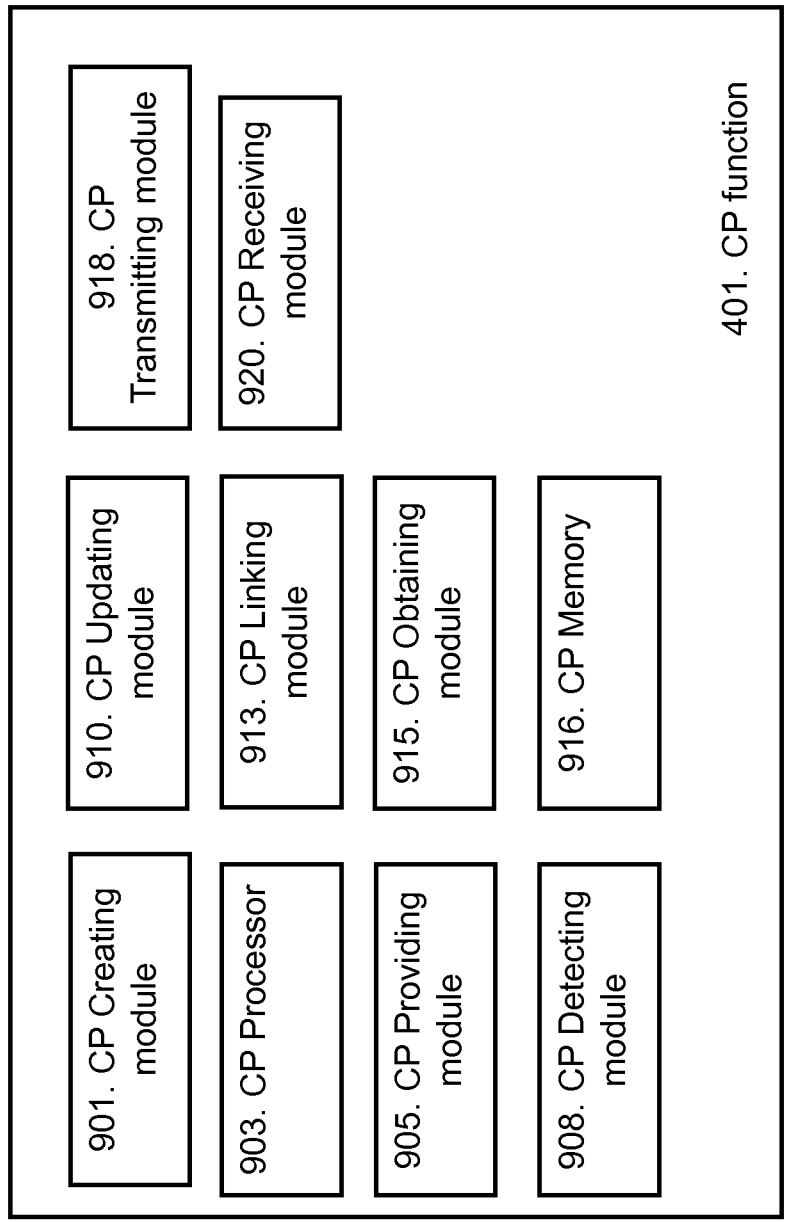
FIG. 9 is a schematic block diagram illustrating embodiments of a CP function.

To perform the method steps shown in FIG. 8 for handling a credit pool comprising a number of granted service units to be used by multiple services, the CP function 401 may comprises an arrangement as shown in FIG. 9. The multiple services are grouped in at least one first RG. The CP function 401 may be a PGW-C, a TDF-C or a combined SGW-C, and PGW-C.

To perform the method steps shown in FIG. 8 for handling a credit pool comprising a number of granted service units to be used by multiple services, the CP function 401 is configured to, e.g. by means of a CP creating module 901, create an individual URR for each of the at least one first RG. Each individual URR comprises a first credit pool threshold. The at least one first RG may be associated with a first threshold associated with service unit volume and/or time for the first RG. The first credit pool threshold may be a sum of all first thresholds, and the first credit pool threshold may be a threshold associated with service unit volume and/or time for the credit pool. A multiplier may be comprised in each of the individual URRs, and the multiplier may indicate how to count user plane packets. The CP creating module 901 may also be referred to as a CP creating unit, a CP creating means, a CP creating circuit, CP means for creating etc. The CP creating module 901 may be a CP processor 903 of the CP function 401.

The CP function 401 is configured to, e.g. by means of a CP providing module 905, provide the individual URRs to a User Plane, UP, function 405. The CP providing module 905 may also be referred to as a CP providing unit, a CP providing means, a CP providing circuit, CP means for providing etc. The CP providing module 905 may be the CP processor 903 of the CP function 401.

The CP function 401 is configured to, e.g. by means of the CP creating module 901, create a URR CRPL. The URR CRPL comprises instructions to the UP function 405 to aggregate service unit usage for all individual URRs for all first RGs. The URR CRPL further comprises the first credit pool threshold. The instruction in the URR CRPL may comprise a list of URR IDs of all individual URRs for all RGs. The URR CRPL may be identified with an URR identification (URR ID) which is mapped from a credit pool ID obtained from a charging node 408.

The CP function 401 is configured to, e.g. by means of the CP providing module 905, provide the URR CRPL to the UP function 405.

The CP function 401 may be configured to, e.g. by means of a CP detecting module 908, detect that at least one second RG should be added to the credit pool. The second RG has a second threshold. The CP detecting module 908 may also be referred to as a CP detecting unit, a CP detecting means, a CP detecting circuit, CP means for detecting etc. The CP detecting module 908 may be the CP processor 903 of the CP function 401.

The CP function 401 may be configured to, e.g. by means of the CP creating module 901, create a second credit pool threshold by adding the second threshold to the first credit pool threshold.

The CP function 401 may be configured to, e.g. by means of the CP creating module 901, create the individual URR for the second RG. The individual URR for the second RG comprises the second credit pool threshold.

The CP function 401 may be configured to, e.g. by means of the CP providing module 905, provide the individual URR for the second RG to the UP function 405.

The CP function 401 may be configured to, e.g. by means of an CP updating module 910, update the instructions comprised in the URR CRPL to additionally aggregate the service unit usage for the second RG. The CP updating module 910 may also be referred to as a CP updating unit, a CP updating means, a CP updating circuit, CP means for updating etc. The CP updating module 910 may be the CP processor 903 of the CP function 401.

The CP function 401 may be configured to, e.g. by means of the CP providing module 905, provide the URR CRPL and all individual URRs for the first RG to the UP function 405 with the updated instructions and the second credit pool threshold.

The CP function 401 may be configured to, e.g. by means of a CP linking module 913, link each of the individual URRs to the URR CRPL. The CP linking module 913 may also be referred to as a CP linking unit, a CP linking means, a CP linking circuit, CP means for linking etc. The CP linking module 913 may be the CP processor 903 of the CP function 401.

The CP function 401 may be configured to, e.g. by means of the CP providing module 905, provide link information in each of the individual URRs.

The CP function 401 may be configured to, e.g. by means of a CP obtaining module 915, obtain, from the UP function 405 for at least one of the individual URRs and the URR CRPL, a usage information indicating service unit usage which has been used by at least one of the multiple services. The CP obtaining module 915 may also be referred to as a CP obtaining unit, a CP obtaining means, a CP obtaining circuit, CP means for obtaining etc. The CP obtaining module 915 may be the CP processor 903 of the CP function 401.

The CP function 401 may be configured to, e.g. by means of the CP providing module 905, provide, to a charging node 408, the usage information and a request for grant of additional service units from the credit pool.

The CP function 401 may be configured to, e.g. by means of the CP obtaining module 915, obtain information indicating the granted additional service units from the charging node 408.

The CP function 401 may be configured to, e.g. by means of the CP creating module 901, create a third credit pool threshold by subtracting the obtained service unit usage from the first credit pool threshold and adding the granted additional service units.

The CP function 401 may be configured to, e.g. by means of the CP providing module 905, provide the URR CRPL and all the individual URRs to the UP function 405 with the third credit pool threshold.

The CP function 401 may be configured to, e.g. by means of the CP obtaining module 915, obtain information indicating a granted quota of service units from the credit pool. The granted quota of service units has been allocated to be used by the multiple services.

In some embodiments, the CP function 401 comprises the CP processor 903 and a CP memory 916. The CP memory 916 comprises instructions executable by the processor 903. The memory 916 is arranged to be used to store data, received data streams, power level measurements, GSU, thresholds, URRs, URR CRPL, RGs, credit pool information, IDs, instructions, usage information, trigger information, multipliers, time periods, configurations, schedulings, and applications to perform the methods herein when being executed in the CP function 401.

The CP function 401 may further comprises a CP transmitting module 918 configured to transmit information, data, messages, rules etc. to another function, node or entity, e.g. the UP function 405. The CP transmitting module 918 may also be referred to as a CP transmitting unit, a CP transmitting means, a CP transmitting circuit, CP means for transmitting, CP output unit etc. The CP transmitting module 918 may be a transmitter, a transceiver etc. The CP transmitting module 918 may be a wireless transmitter of the CP function 401 of a wireless or fixed communications system. The CP transmitting module 918 may be same as the CP providing module 905.

The CP function 401 may further comprises a CP receiving module 920 configured to receive information, data, messages, rules etc. from another function or node or entity, e.g. the CP function 401. The CP receiving module 920 may also be referred to as a CP receiving unit, a CP receiving means, a CP receiving circuit, CP means for receiving, CP input unit etc. The CP receiving module 920 may be a receiver, a transceiver etc. The CP receiving module 920 may be a wireless receiver of the UP function 405 of a wireless or fixed communications system. The CP receiving module 920 may be same as the CP obtaining module 915.

Those skilled in the art will also appreciate that the CP creating module 901, the CP providing module 905, the CP detecting module 908, the CP updating module 910, the CP linking module 913, the CP obtaining module 915, the CP transmitting module 918 and the CP receiving module 920 described above may refer to a combination of analog and digital circuits, and/or one or more processors configured with software and/or firmware, e.g. stored in a memory, that when executed by the one or more processors such as the CP processor 903 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 10:
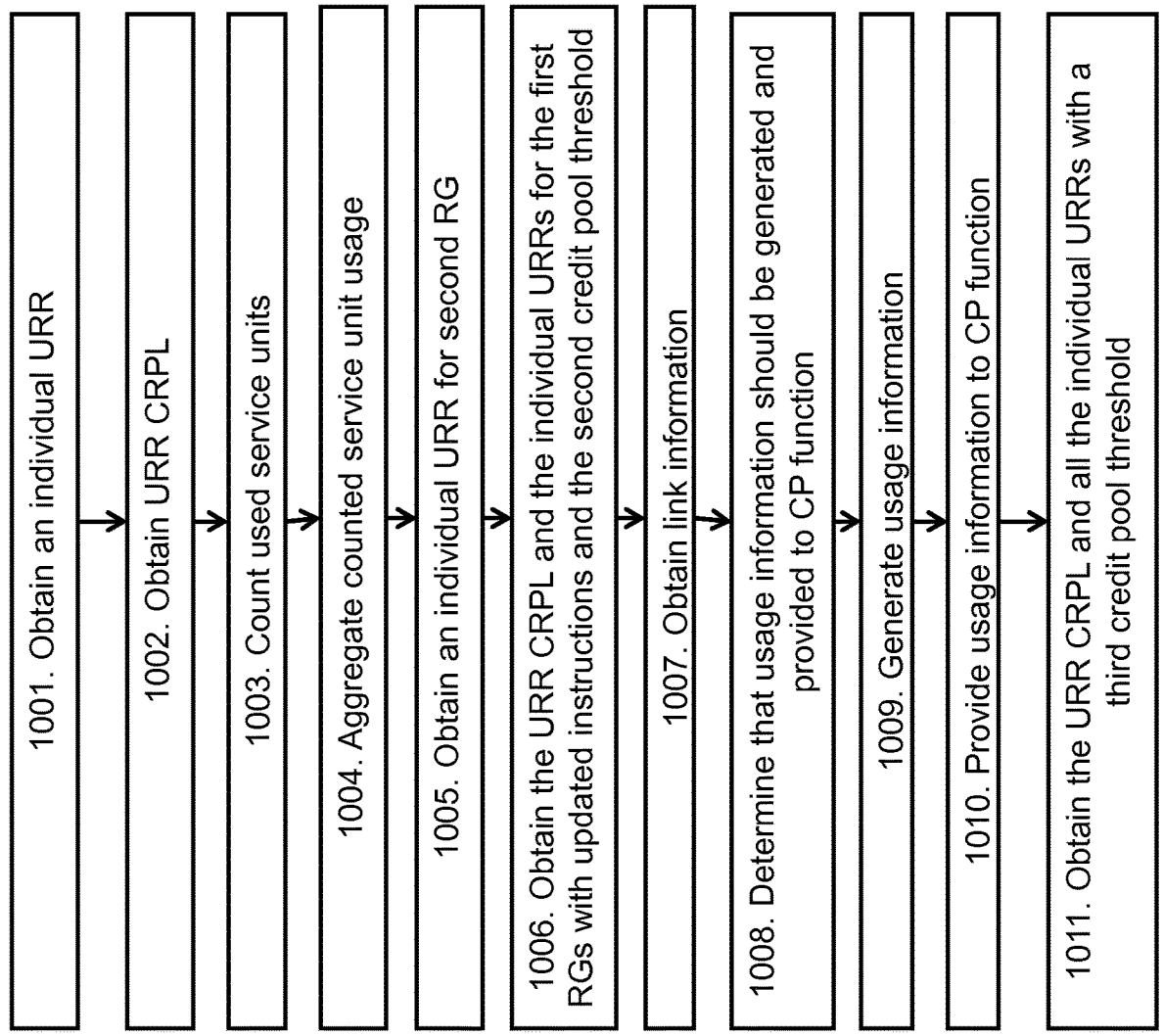
FIG. 10 is a flow chart illustrating embodiments of a method performed by a UP function.

The method described above will now be described seen from the perspective of the UP function 405. FIG. 10 is a flowchart describing the present method performed by the UP function 405, for handling a credit pool comprising a number of granted service units to be used by multiple services. The multiple services are grouped in at least one first RG.

The UP function 405 may be a PGW-U, a TDF-U or a combined SGW-U, and PGW-U.

The method illustrated in FIG. 10 comprises at least one of the following steps, which steps may be performed in any suitable order than described below:

Step 1001

This step corresponds to step 602 in FIG. 6 and step 701 in FIG. 7.

The UP function 405 obtains, from the CP, function 401, an URR for each of the at least one first RGs. Each individual URR comprises a first credit pool threshold.

This may also described as the UP function 405 obtains, from the CP, function 401, an URR for each of the at least one RGs. Each individual URR comprises a credit pool threshold.

The at least one first RG may be associated with a first threshold associated with service unit volume and/or time for the first RG. The first credit pool threshold may be a sum of all first thresholds, and the first credit pool threshold may be a threshold associated with service unit volume and/or time for the credit pool. This may also be described as the at least one RG is associated with a respective individual threshold associated with service unit volume and/or time for the RG, wherein the credit pool threshold is a sum of all individual thresholds.

A multiplier may be comprised in each of the individual URRs, and the multiplier may indicate how to count the service units. The multiplier may be set according to RFC4006, August 2005.

Step 1002

This step corresponds to step 602 in FIG. 6 and step 701 in FIG. 7.

The UP function 405, may obtain, from the CP function 401, a URR CRPL. The URR CRPL comprises instructions to aggregate service unit usage for all individual URRs for all first RGs in the credit pool, and the URR CRPL further comprises the first credit pool threshold.

This may also be described as the UP function 405, may obtain, from the CP function 401, a URR CRPL. The URR CRPL comprises instructions to aggregate service unit usage for all individual URRs for all RGs in the credit pool, and wherein the URR CRPL further comprises the credit pool threshold;

The instruction in the URR CRPL may comprise a list of IDs of all individual URRs for all first RGs. This may also be described as the instruction in the URR CRPL may comprise a list of IDs of all individual URRs for all RGs.

Step 1003

This step corresponds to step 603 in FIG. 6.

The UP function 405 counts or measures the used service units for each individual URR for all first RGs in the credit pool. The counted used service units may be for example as follows:

Individual URR 1 for first RG 1: Used service units=100
Individual URR 2 for first RG 2: Used service units=80
Individual URR 3 for first RG 3: Used service units=90

This may also be described as the UP function 405 counts of measured the used service units for each individual URR for all RGs in the credit pool. The counted used service units may be for example as follows:

Individual URR 1 for RG 1: Used service units=100
Individual URR 2 for RG 2: Used service units=80
Individual URR 3 for RG 3: Used service units=90

The counting may be done taking the multiplier into account.

Step 1004

This step corresponds to step 603 in FIG. 6.

The UP function 405 aggregates the counted service unit usage for all individual URRs for all first RGs in the credit pool. The aggregated counted used service units may be for example as follows:

Used service unit for individual URR 1 for first RG 1+Used service unit for individual URR 2 for first RG 2+Used service unit for individual URR 3 for first RG 3=100+80+90=270

The UP function 405 aggregates the counted service unit usage for all individual URRs for all RGs in the credit pool. The aggregated counted used service units may be for example as follows:

Used service unit for individual URR 1 for RG 1+Used service unit for individual URR 2 for RG 2+Used service unit for individual URR 3 for RG 3=100+80+90=270

Step 1005

This step corresponds to step 613 in FIG. 6 and step 703 in FIG. 7.

The UP function 405 may obtain an individual URR for at least one second RG from the CP function 401. The individual URR for the second RG comprises a second credit pool threshold which is the sum of the first credit pool threshold and a second threshold for the second RG.

This may also be described as the UP function 405 may obtain an individual URR for at least one additional RG from the CP function 401. The additional individual URR comprises an updated credit pool threshold has been updated with an additional threshold for the additional RG.

Step 1006

This step corresponds to step 613 in FIG. 6 and step 703 in FIG. 7.

The UP function 405 may obtain the URR CRPL and the individual URRs for the first RGs from the CP function 401 with updated instructions and the second credit pool threshold.

This may also be described as the UP function 405 may obtain the URR CRPL and the individual URRs from the CP function 401 with updated instructions and updated credit pool threshold which has been updated with respect to the additional RG.

Step 1007

The UP function 405 may obtain link information in each of the individual URRs. The link information indicates a link between each of the individual URRs and the URR CRPL.

Step 1008

This step corresponds to step 603 in FIG. 6.

The UP function 405 may determine that usage information for at least one of the individual URRs and the URR CRPL should be generated and provided to the CP function 401. The usage information indicates service unit usage which has been used by at least one of the multiple services.

The decision to generate and provide usage information for at least one of the individual URR and the URR CRPL to the CP function 401 may be triggered by that the aggregated usage has reached or exceeded a threshold, or e.g. by a change of Radio Access Technology, RAT, type for one of the RGs as defined in the reporting triggers.

Step 1009

This step corresponds to step 603 in FIG. 6.

The UP function 405 may generate the usage information for at least one of the individual URRs and the URR CRPL. The usage information may be comprised in a usage report. The generation may be done according to a reporting trigger defined in the individual URRs.

Step 1010

This step corresponds to step 604 in FIG. 6 and step 705 in FIG. 7.

The UP function 405 may provide the generated usage information to the CP function 401.

Step 1011

This step corresponds to step 609 in FIG. 6 and step 709 in FIG. 7.

The UP function 405 may obtain the URR CRPL and all the individual URRs from the CP function 401 with a third credit pool threshold. The third credit pool threshold has been updated by the CP function 401 by subtracting the service unit usage from the first credit pool threshold and adding granted additional service units.

This may also be described as the UP function 405 may obtain the URR CRPL and all the individual URRs from the CP function 401 with a updated credit pool threshold, wherein the update credit pool threshold has been updated by the CP function 401 by subtracting the service unit usage from the current credit pool threshold and adding granted additional service units.

In some embodiments, a computer program may comprise instructions which, when executed on at least one processor, cause the at least one processor to carry out at least one of the method steps 1001-1011. A carrier may comprise the computer program, and the carrier is one of an electronic signal, optical signal, radio signal or computer readable storage medium.

Figure 11:
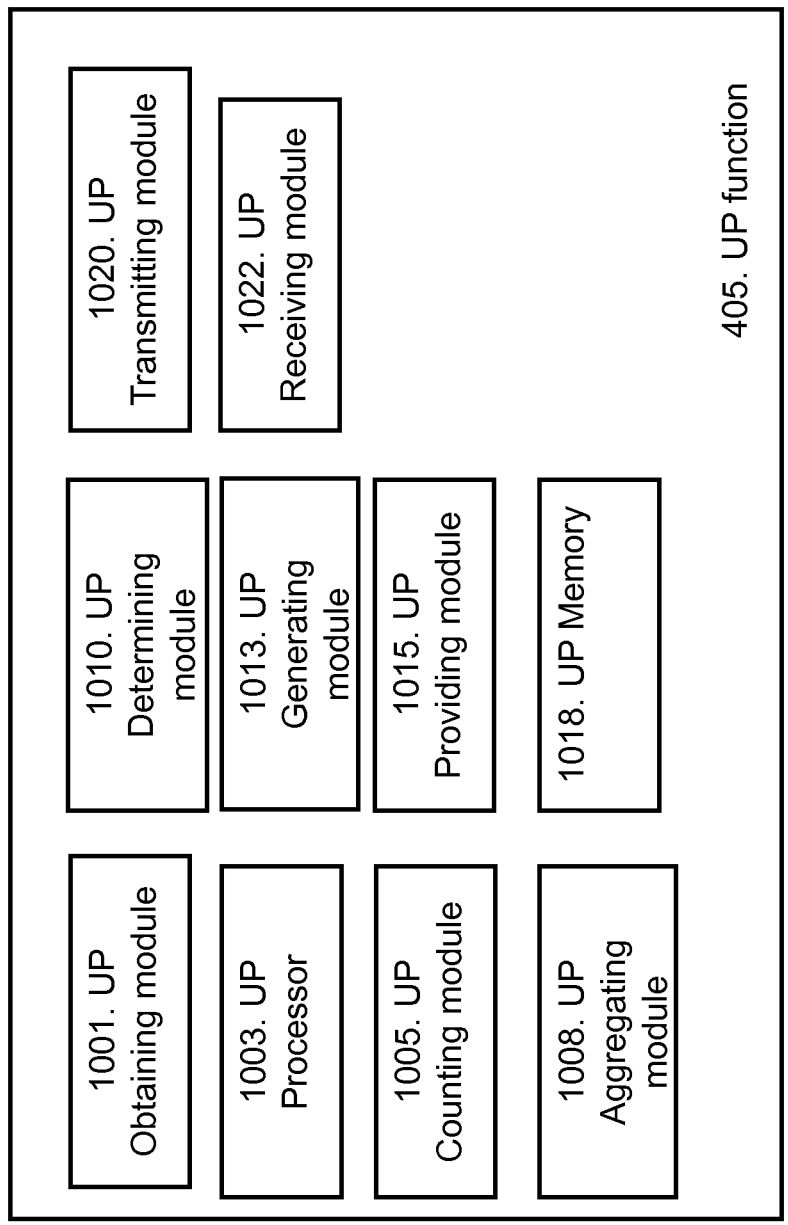
FIG. 11 is a schematic block diagram illustrating embodiments of a UP function.

To perform the method steps shown in FIG. 10 for handling a credit pool comprising a number of granted service units to be used by multiple services, the UP function 405 may comprises an arrangement as shown in FIG. 11. The multiple services are grouped in at least one first RG. The UP function 405 may be a PGW-U, a TDF-U or a combined SGW-U, and PGW-U.

To perform the method steps shown in FIG. 10 for handling a credit pool comprising a number of granted service units to be used by multiple services, the UP function 405 is configured to, e.g. by means of an UP obtaining module 1001, obtain, from a CP function 401, an individual URR for each of the at least one first RGs. Each individual URR comprises a first credit pool threshold. The at least one first RG may be associated with a first threshold associated with service unit volume and/or time for the first RG. The first credit pool threshold may be a sum of all first thresholds, and the first credit pool threshold may be a threshold associated with service unit volume and/or time for the credit pool. A multiplier may be comprised in each of the individual URRs, and the multiplier may indicate how to count the service units. The UP obtaining module 1001 may also be referred to as a UP obtaining unit, a UP obtaining means, a UP obtaining circuit, UP means for obtaining etc. The UP obtaining module 1001 may be a UP processor 1003 of the UP function 405.

The UP function 405 is further configured to, e.g. by means of the UP obtaining module 1001, obtain a URR CRPL from the CP function 401. The URR CRPL comprises instructions to aggregate service unit usage for all individual URRs for all first RGs. The URR CRPL further comprises the first credit pool threshold. The instructions in the URR CRPL may comprise a list of IDs of all individual URRs for all first RGs.

The UP function 405 is further configured to, e.g. by means of a UP counting module 1005, count the used service units for each individual URRs for the first RGs. The UP counting module 1005 may also be referred to as a UP counting unit, a UP counting means, a UP counting circuit, UP means for counting etc. The UP counting module 1005 may be the UP processor 1003 of the UP function 405.

The UP function 405 is further configured to, e.g. by means of a UP aggregating module 1008, aggregate the counted service unit usage for all individual URRs for all first RGs. The UP aggregating module 1008 may also be referred to as a UP aggregating unit, a UP aggregating means, a UP aggregating circuit, UP means for aggregating etc. The UP aggregating module 1008 may be the UP processor 1003 of the UP function 405.

The UP function 405 may be further configured to, e.g. by means of the UP obtaining module 1001, obtain an individual URR for at least one second RG from the CP function 401. The individual URR for the second RG comprises a second credit pool threshold which is the sum of the first credit pool threshold and a second threshold for the second RG.

The UP function 405 may be further configured to, e.g. by means of the UP obtaining module 1001, obtain the URR CRPL and the individual URRs for the first RGs from the CP function 401 with updated instructions and the second credit pool threshold.

The UP function 405 may be further configured to, e.g. by means of the UP obtaining module 1001, obtain link information in each of the individual URRs. The link information indicates a link between each of the individual URRs and the URR CRPL.

The UP function 405 may be further configured to, e.g. by means of a UP determining module 1010, determine that usage information for at least one of the individual URRs and the URR CRPL should be generated and provided to the CP function 401. The usage information indicates service unit usage which has been used by at least one of the multiple services. The determining that usage information for at least one of the individual URR and the URR CRPL should be generated and provided to the CP function 401 may be triggered by that the aggregated usage has reached or exceeded a threshold, or e.g. by a change of RAT type for one of the RGs. The UP determining module 1010 may also be referred to as a UP determining unit, a UP determining means, a UP determining circuit, UP means for determining etc. The UP determining module 1010 may be the UP processor 1003 of the UP function 405.

The UP function 405 may be further configured to, e.g. by means of a UP generating module 1013, generate the usage information for at least one of the individual URRs and the URR CRPL. The UP generating module 1013 may also be referred to as a UP generating unit, a UP generating means, a UP generating circuit, UP means for generating etc. The UP generating module 1013 may be the UP processor 1003 of the UP function 405.

The UP function 405 may be further configured to, e.g. by means of a UP providing module 1015, provide the generated usage information to the CP function 401. The UP providing module 1015 may also be referred to as a UP providing unit, a UP providing means, a UP providing circuit, UP means for providing etc. The UP providing module 1015 may be the UP processor 1003 of the UP function 405.

The UP function 405 may be further configured to, e.g. by means of the UP obtaining module 1001, obtain the URR CRPL and all the individual URRs from the CP function 401 with a third credit pool threshold. The third credit pool threshold has been updated by the CP function 401 by subtracting the service unit usage from the first credit pool threshold and adding granted additional service units.

In some embodiments, the UP function 405 comprises the UP processor 1003 and a UP memory 1018. The UP memory 1003 comprises instructions executable by the UP processor 1018. The UP memory 1003 is arranged to be used to store data, received data streams, power level measurements, GSU, thresholds, URRs, URR CRPL, RGs, credit pool information, IDs, instructions, usage information, trigger information, multipliers, time periods, configurations, schedulings, and applications to perform the methods herein when being executed in the UP function 405.

The UP function 405 may further comprises a UP transmitting module 1020 configured to transmit information, data, messages, rules etc. to another function, node or entity, e.g. the CP function 401. The UP transmitting module 1020 may also be referred to as a UP transmitting unit, a UP transmitting means, a UP transmitting circuit, UP means for transmitting, UP output unit etc. The transmitting module 918 may be a transmitter, a transceiver etc. The transmitting module 918 may be a wireless transmitter of the UP function 405 of a wireless or fixed communications system. The UP transmitting module 1020 may be same as the UP providing module 1015.

The UP function 405 may further comprises a UP receiving module 1022 configured to receive information, data, messages, rules etc. from another function or node or entity, e.g. the CP function 401. The UP receiving module 1022 may also be referred to as a UP receiving unit, a UP receiving means, a UP receiving circuit, UP means for receiving, UP input unit etc. The UP receiving module 1022 may be a receiver, a transceiver etc. The UP receiving module 1022 may be a wireless receiver of the UP function 405 of a wireless or fixed communications system. The UP receiving module 1022 may be same as the UP obtaining module 1001.

Those skilled in the art will also appreciate that the UP obtaining module 1001, the UP counting module 1005, the UP aggregating module 1008, the UP determining module 1010, the UP generating module 1013, the UP providing module 1015, the UP transmitting module 1020 and the UP receiving module 1022 described above may refer to a combination of analog and digital circuits, and/or one or more processors configured with software and/or firmware, e.g. stored in a memory, that when executed by the one or more processors such as the UP processor 1003 perform as described above. One or more of these processors, as well as the other digital hardware, may be included in a single ASIC, or several processors and various digital hardware may be distributed among several separate components, whether individually packaged or assembled into a SoC.

The present mechanism for handling a credit pool comprising granted service units to be used by multiple services may be implemented through one or more processors, such as a CP processor 903 in the CP function arrangement depicted in FIG. 9 and a UP processor 1003 in the UP function arrangement depicted in FIG. 11, together with computer program code for performing the functions of the embodiments herein. The processor may be for example a Digital Signal Processor (DSP), ASIC processor, Field-programmable gate array (FPGA) processor or microprocessor. The program code mentioned above may also be provided as a computer program product, for instance in the form of a data carrier carrying computer program code for performing the embodiments herein when being loaded into at least one of the CP function 401 and the UP function 405. One such carrier may be in the form of a CD ROM disc. It is however feasible with other data carriers such as a memory stick. The computer program code can furthermore be provided as pure program code on a server and downloaded to at least one of the CP function 401 and the UP function 405.

Some embodiments described herein may be summarized in the following manner:

As mentioned earlier, the prior art solution is unnecessarily complicated by providing the credit pool concept into the UP. The reason for this is that the UP function 405 does need to have information about the credit pool. The UP function 405 only needs to know how to count the packets per service data flow (network usage).

A new Usage Reporting Rule (i.e. the URR CRPL), in addition to be created per RG and per bearer, is created by the CP function 401, and provided from the CP function 401 to the UP function 405, to control the reporting on for each of the Credit Pool requested by the charging node 408, e.g. the OCS.

In the URR CRPL, a parameter, preferably called "aggregating usage of reports", may be included. The parameter may be set to a list of usage reporting rules, i.e. the URR CRPL does not have any PDR associated, it simply aggregates all network usage counted by associated URR(s). The ID of the URR CRPL may be set to the Credit Pool ID within the session, otherwise the mapping is needed between this URR ID and the credit pool ID.

In the URR CRPL, a volume/time Threshold is set to the volume/time threshold for the pool. The quota is not applicable to the URR CRPL since it need not enforce any action upon quota exhaustion.

For each individual URR, the URR CRPL (which corresponds to the Credit Pool) are aggregating the usage from, may be set to be linked to the URR CRPL, which indicates that, as long as the URR CRPL generates a usage report, these individual URRs may also generate usage reports. Each individual URR may include a multiplier parameter which is associated with instructions on how the packets matching the PDR shall be counted, e.g. the multiplier is a relative proportional figure among those services in the same pool. For instance, if the rating parameter for service 1 is $1/MB and the rating parameter for service 2 is $0.5/MB, the multipliers could be 10 and 5 for services 1 and 2, respectively." In this example, if URR1 is for Service 1 (RG1), URR2 is for Service 2 (RG2), then the multiplier in URR1 is set 10, and the multiplier in URR2 is set to 5.

The UP function 405 may be described as being fully controlled by URR, it counts usages per individual URR. In addition, the UP function 405 aggregates the usage from all URRs sharing the same credit pool (which is instructed by the CP function 401 with the aggregating URRs parameter in the URR CRPL). Based on the URRs, the UP function 405 decides if it should generate a usage report. The usage report is generated for example when reaching the credit pool threshold or a usage report may be generated by other conditions, e.g. RAT type change for one of charging key. When the CP function 401 obtains such usage report, it likely updates the individual URRs and the URR CRPL.

In some embodiments, at least one computer program may comprise instructions which, when executed on at least one processor, cause the at least one processor to carry out at least one of the method steps in FIG. 6 and/or FIG. 7. A carrier may comprise the computer program, and the carrier is one of an electronic signal, optical signal, radio signal or computer readable storage medium.

The embodiments herein are not limited to the above described embodiments. Various alternatives, modifications and equivalents may be used. Therefore, the above embodiments should not be taken as limiting the scope of the embodiments, which is defined by the appending claims. A feature from one embodiment may be combined with one or more features of any other embodiment.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The terms "consisting of" or "consisting essentially of" may be used instead of the term comprising.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method performed by a Control Plane (CP) function for handling a credit pool comprising granted service units to be used by multiple services, wherein the multiple services are grouped in at least one first Rating Group (RG), the method comprising:
   creating an individual Usage Reporting Rule (URR) for each of the at least one first RG, wherein each individual URR comprises a first credit pool threshold;
   providing the individual URRs to a User Plane (UP) function;
   creating a Usage Reporting Rule for the Credit Pool (URR CRPL), wherein the URR CRPL comprises instructions to the UP function to aggregate service unit usage for all individual URRs for all first RGs, and wherein the URR CRPL further comprises the first credit pool threshold; and
   providing the URR CRPL to the UP function.

2. The method of claim 1, further comprising:
   detecting that at least one second RG should be added to the credit pool, wherein the second RG has a second threshold;
   creating a second credit pool threshold by adding the second threshold to the first credit pool threshold;
   creating the individual URR for the second RG, wherein the individual URR for the second RG comprises the second credit pool threshold;
   providing the individual URR for the second RG to the UP function;
   updating the instructions comprised in the URR CRPL to additionally aggregate the service unit usage for the second RG; and
   providing the URR CRPL and all individual URRs for the first RG to the UP function with the updated instructions and the second credit pool threshold.

3. The method of claim 1, further comprising:
   linking each of the individual URRs to the URR CRPL; and
   providing link information in each of the individual URRs.

4. The method of claim 1, further comprising:
   obtaining, from the UP function for at least one of the individual URRs and the URR CRPL, a usage information indicating service unit usage which has been used by at least one of the multiple services;
   providing, to a charging node, the usage information and a request for grant of additional service units from the credit pool;
   obtaining information indicating the granted additional service units from the charging node;
   creating a third credit pool threshold by subtracting the obtained service unit usage from the first credit pool threshold and adding the granted additional service units; and
   providing the URR CRPL and all the individual URRs to the UP function with the third credit pool threshold.

5. The method of claim 1, further comprising obtaining information indicating a granted quota of service units from the credit pool, wherein the granted quota of service units has been allocated to be used by the multiple services.

6. The method of claim 1:
   wherein the at least one first RG is associated with a first threshold associated with service unit volume and/or time for the first RG;
   wherein the first credit pool threshold is a sum of all first thresholds; and
   wherein the first credit pool threshold is a threshold associated with service unit volume and/or time for the credit pool.

7. The method of claim 1, wherein the CP function is a Packet Data Network Gateway-Control plane function (PGW-C), a Traffic Detection Function-Control plane function (TDF-C), or a combined Serving Gateway-Control plane function (SGW-C) and PGW-C.

8. A method performed by a User Plane (UP) function for handling a credit pool comprising granted service units to be used by multiple services, wherein the multiple services are grouped in at least one first Rating Group (RG), the method comprising:
   obtaining, from a Control Plane (CP) function, an individual Usage Reporting Rule (URR) for each of the at least one first RGs, wherein each individual URR comprises a first credit pool threshold;
   obtaining a Usage Reporting Rule for the Credit Pool (URR CRPL) from the CP function, wherein the URR CRPL comprises instructions to aggregate service unit usage for all individual URRs for all first RGs, and wherein the URR CRPL further comprises the first credit pool threshold;
   counting the used service units for each individual URRs for the first RGs; and
   aggregating the counted service unit usage for all individual URRs for all first RGs.

9. The method of claim 8, further comprising:
   obtaining an individual URR for at least one second RG from the CP function, wherein the individual URR for the second RG comprises a second credit pool threshold which is the sum of the first credit pool threshold and a second threshold for the second RG; and
   obtaining the URR CRPL and the individual URRs for the first RGs from the CP function with updated instructions and the second credit pool threshold.

10. The method of claim 8, further comprising obtaining link information in each of the individual URRs, the link information indicating a link between each of the individual URRs and the URR CRPL.

11. The method of claim 8, further comprising:
   determining that usage information for at least one of the individual URRs and the URR CRPL should be generated and provided to the CP function, wherein the usage information indicates service unit usage which has bene used by at least one of the multiple services;
   generating the usage information for at least one of the individual URRs and the URR CRPL; and
   providing the generated usage information to the CP function.

12. The method of claim 11, wherein the determining that usage information for at least one of the individual URR and the URR CRPL should be generated and provided to the CP function is triggered by that the aggregated usage has reached or exceeded a threshold.

13. The method of claim 8, further comprising:
obtaining the URR CRPL and all the individual URRs from the CP function with a third credit pool threshold;
wherein the third credit pool threshold has been updated by the CP function by subtracting the service unit usage from the first credit pool threshold and adding granted additional service units.

14. The method of claim 8:
wherein the at least one first RG is associated with a first threshold associated with service unit volume and/or time for the first RG;
wherein the first credit pool threshold is a sum of all first thresholds; and
wherein the first credit pool threshold is a threshold associated with service unit volume and/or time for the credit pool.

15. The method of claim 8, wherein the UP function is a Packet Data Network Gateway-User plane function (PGW-U), a Traffic Detection Function-User plane function (TDF-U), or a combined Serving Gateway-User plane function (SGW-U) and PGW-U.

16. A Control Plane (CP) function for handling a credit pool comprising granted service units to be used by multiple services, wherein the multiple services are grouped in at least one first Rating Group (RG), the CP function comprising:
processing circuitry;
memory containing instructions executable by the processing circuitry whereby the CP function is operative to:
create an individual Usage Reporting Rule (URR) for each of the at least one first RG, wherein each individual URR comprises a first credit pool threshold;
provide the individual URRs to a User Plane (UP) function;
create a Usage Reporting Rule for the Credit Pool (URR CRPL) wherein the URR CRPL comprises instructions to the UP function to aggregate service unit usage for all individual URRs for all first RGs, and wherein the URR CRPL further comprises the first credit pool threshold; and
provide the URR CRPL to the UP function.

17. The CP function of claim 16, wherein the instructions are such that the CP function is operative to:
detect that at least one second RG should be added to the credit pool, wherein the second RG has a second threshold;
create a second credit pool threshold by adding the second threshold to the first credit pool threshold;
create the individual URR for the second RG, wherein the individual URR for the second RG comprises the second credit pool threshold;
provide the individual URR for the second RG to the UP function;
update the instructions comprised in the URR CRPL to additionally aggregate the service unit usage for the second RG; and
provide the URR CRPL and all individual URRs for the first RG to the UP function with the updated instructions and the second credit pool threshold.

18. The CP function of claim 16, wherein the instructions are such that the CP function is operative to:
link each of the individual URRs to the URR CRPL; and
provide link information in each of the individual URRs.

19. The CP function of claim 16, wherein the instructions are such that the CP function is operative to:
obtain, from the UP function for at least one of the individual URRs and the URR CRPL, usage information indicating service unit usage which has been used by at least one of the multiple services;
provide, to a charging node, the usage information and a request for grant of additional service units from the credit pool;
obtain information indicating the granted additional service units from the charging node;
create a third credit pool threshold by subtracting the obtained service unit usage from the first credit pool threshold and adding the granted additional service units; and
provide the URR CRPL and all the individual URRs to the UP function with the third credit pool threshold.

20. The CP of claim 16, wherein the CP function is a Packet Data Network Gateway-Control plane function (PGW-C), a Traffic Detection Function-Control plane function (TDF-C), or a combined Serving Gateway-Control plane function (SGW-C) and PGW-C.

21. A User Plane (UP) function for handling a credit pool comprising granted service units to be used by multiple services, wherein the multiple services are grouped in at least one first Rating Group (RG), the UP function comprising:
processing circuitry;
memory containing instructions executable by the processing circuitry whereby the UP function is operative to:
obtain, from a Control Plane (CP) function, an individual Usage Reporting Rule (URR) for each of the at least one first RGs, wherein each individual URR comprises a first credit pool threshold;
obtain a Usage Reporting Rule for the Credit Pool (URR CRPL) from the CP function, wherein the URR CRPL comprises instructions to aggregate service unit usage for all individual URRs for all first RGs, and wherein the URR CRPL further comprises the first credit pool threshold;
count the used service units for each individual URRs for the first RGs; and to
aggregate the counted service unit usage for all individual URRs for all first RGs.

22. The UP function of claim 21, wherein the instructions are such that the UP function is operative to:
obtain an individual URR for at least one second RG from the CP function, wherein the individual URR for the second RG comprises a second credit pool threshold which is the sum of the first credit pool threshold and a second threshold for the second RG; and
obtain the URR CRPL and the individual URRs for the first RGs from the CP function with updated instructions and the second credit pool threshold.

23. The UP function of claim 21, wherein the instructions are such that the UP function is operative to obtain link information in each of the individual URRs, the link information indicating a link between each of the individual URRs and the URR CRPL.

24. The UP function of claim 21, wherein the instructions are such that the UP function is operative to:
determine that usage information for the individual URRs and/or the URR CRPL should be generated and provided to the CP function, wherein the usage information indicates service unit usage which has bene used by at least one of the multiple services;

generate the usage information for at least one of the individual URRs and the URR CRPL; and provide the generated usage information to the CP function.

25. The UP function of claim 24, wherein the determining that the usage information should be generated and provided to the CP function is triggered by that the aggregated usage has reached or exceeded a threshold.

* * * * *